United States Patent
Resch

(10) Patent No.: US 9,930,974 B2
(45) Date of Patent: Apr. 3, 2018

(54) COOLING DEVICE

(71) Applicant: AHT COOLING SYSTEMS GMBH, Rottenmann (AT)

(72) Inventor: Reinhold Resch, St. Peter (AT)

(73) Assignee: AHT COOLING SYSTEMS GMBH, Rottenmann (AT)

( * ) Notice: Subject to any disclaimer, the term of this patent is extended or adjusted under 35 U.S.C. 154(b) by 101 days.

(21) Appl. No.: 14/423,043

(22) PCT Filed: Aug. 6, 2013

(86) PCT No.: PCT/EP2013/066456
§ 371 (c)(1),
(2) Date: Feb. 20, 2015

(87) PCT Pub. No.: WO2014/029613
PCT Pub. Date: Feb. 27, 2014

(65) Prior Publication Data
US 2016/0220040 A1    Aug. 4, 2016

(30) Foreign Application Priority Data

Aug. 22, 2012 (DE) .......... 10 2012 107 713

(51) Int. Cl.
*A47F 3/04* (2006.01)
*B23P 19/04* (2006.01)

(52) U.S. Cl.
CPC .......... *A47F 3/0447* (2013.01); *A47F 3/0443* (2013.01); *B23P 19/04* (2013.01)

(58) Field of Classification Search
CPC ........ F25D 23/16; A47F 3/047; A47F 3/0452; A47F 3/0443; A47F 3/0447; B23P 19/04
(Continued)

(56) References Cited

U.S. PATENT DOCUMENTS 3,850,003 A * 11/1974 Beckwith .............. F25D 21/125
62/256
4,953,363 A *  9/1990 Primozic ............... A47F 3/0495
312/116
(Continued)

FOREIGN PATENT DOCUMENTS

CA       676 020 A     12/1963
CA       821 795 A      9/1969
(Continued)

OTHER PUBLICATIONS

Form PCT/ISA/210, English language version of the International Search Report for PCT/EP2013/066456, ISA—European Patent Office, 3 pages.
(Continued)

*Primary Examiner* — Nicholas J Weiss
*Assistant Examiner* — Andrew P Bainbridge
(74) *Attorney, Agent, or Firm* — Pauley Erickson & Kottis

(57) ABSTRACT

A cooling unit having, on two sides, supporting C-shaped lateral frames. The lateral frames are formed from frame profiles having a rear-sided vertical profile and a lower and an upper forward-projecting horizontal profile. A rear wall group having a heat-insulating outer covering is mounted on the vertical profiles, a base group is mounted on the lower horizontal profile and an upper group is mounted on the upper horizontal profile, and the groups surround a cooling chamber from behind, below and above. The construction has at least the outer covering of the rear wall group arranged on the inner side, facing the cooling chamber, of the vertical profile.

24 Claims, 22 Drawing Sheets

(58) Field of Classification Search
USPC ..... 62/255–256; 248/221.2, 222.4, 235, 239, 248/241; 312/116, 400–410
See application file for complete search history.

(56) References Cited

U.S. PATENT DOCUMENTS

| | | | |
|---|---|---|---|
| 5,440,894 A | | 8/1995 | Schaeffer et al. |
| 5,475,987 A | * | 12/1995 | McGovern ............ A47F 3/0447 62/256 |
| 5,924,297 A | * | 7/1999 | Wolff .................... A47F 3/0456 62/152 |
| 7,637,575 B2 | * | 12/2009 | Amari ................... A47F 3/0469 312/116 |
| 2005/0257548 A1 | | 11/2005 | Grassmuck et al. |
| 2009/0215381 A1 | * | 8/2009 | Swofford ............... A47F 3/0447 454/193 |
| 2010/0313588 A1 | * | 12/2010 | Swofford ............... A47F 3/0443 62/251 |
| 2011/0302945 A1 | | 12/2011 | Howington et al. |
| 2013/0019621 A1 | * | 1/2013 | Wood .................... A47F 3/0447 62/126 |
| 2015/0208828 A1 | | 7/2015 | Resch |
| 2015/0230627 A1 | | 8/2015 | Resch |
| 2016/0220040 A1 | * | 8/2016 | Resch ................... A47F 3/0447 |

FOREIGN PATENT DOCUMENTS

| | | |
|---|---|---|
| CN | 1 935 060 A | 3/2007 |
| DE | 297 17 444 U1 | 1/1998 |
| DE | 102 19 101 A1 | 11/2003 |
| DE | 20 2006 007152 U1 | 8/2006 |
| DE | 10 2006 020 717 B3 | 7/2007 |
| DE | 20 2010 008 333 U1 | 12/2010 |
| EP | 0 696 893 A | 2/1996 |
| EP | 1 359 381 A2 | 11/2003 |
| EP | 1 743 552 A1 | 1/2007 |
| EP | 2 190 321 A1 | 6/2010 |
| FR | 2 907 202 A1 | 4/2008 |
| JP | S48-45596 U | 6/1973 |
| JP | S51-125372 U | 10/1976 |
| JP | 52-028053 A | 3/1977 |
| JP | S58-20885 U | 2/1983 |
| JP | S59-76973 U | 5/1984 |
| JP | S61-3378 | 1/1986 |
| JP | 62-105077 | 5/1987 |
| JP | H01-158092 U | 10/1989 |
| JP | H04-110365 U | 9/1992 |
| JP | H06 265 255 A | 9/1994 |
| JP | 2001-221561 A | 8/2001 |
| TW | 382439 U | 2/2000 |
| WO | WO 94/26154 A1 | 11/1994 |
| WO | WO 2005/074749 A1 | 8/2005 |
| WO | WO 2005/075910 A1 | 8/2005 |
| WO | WO 2009/015674 A1 | 2/2009 |
| WO | WO 2011/074993 A1 | 6/2011 |
| WO | WO 2011/074994 A1 | 6/2011 |
| WO | WO 2012/025240 A2 | 3/2012 |
| WO | WO 2013/002849 A1 | 1/2013 |

OTHER PUBLICATIONS

Form PCT/ISA/237, German language version of the Written Opinion of the International Searching Authority for PCT/EP2013/066456, ISA—European Patent Office, 10 pages.

* cited by examiner

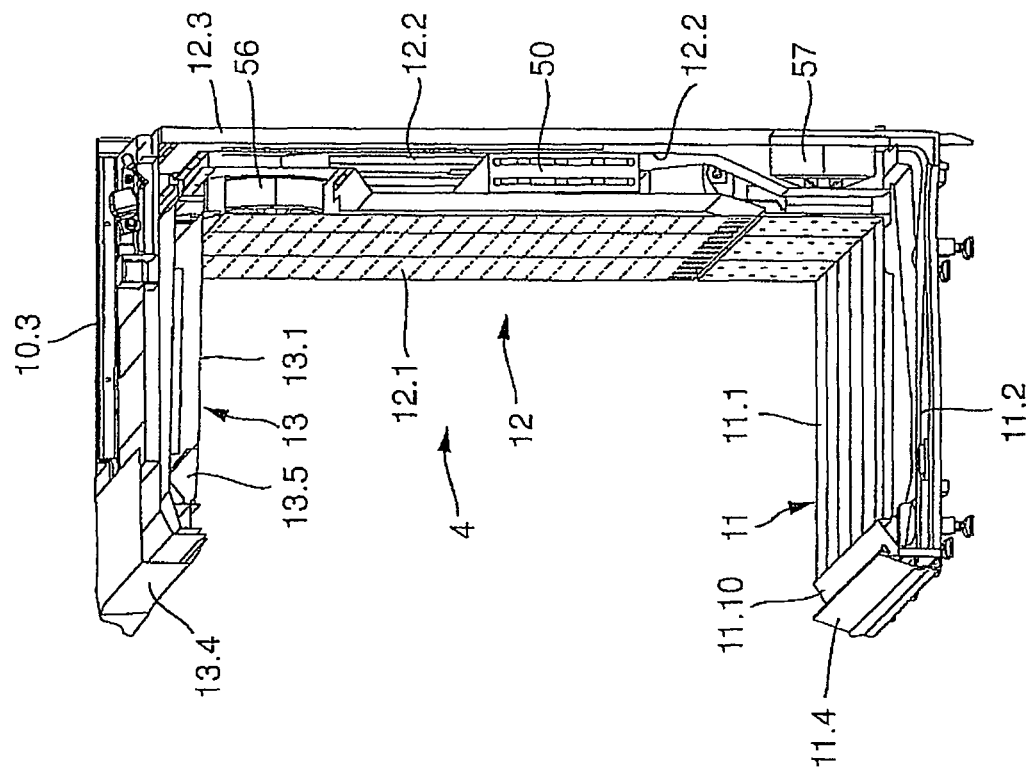
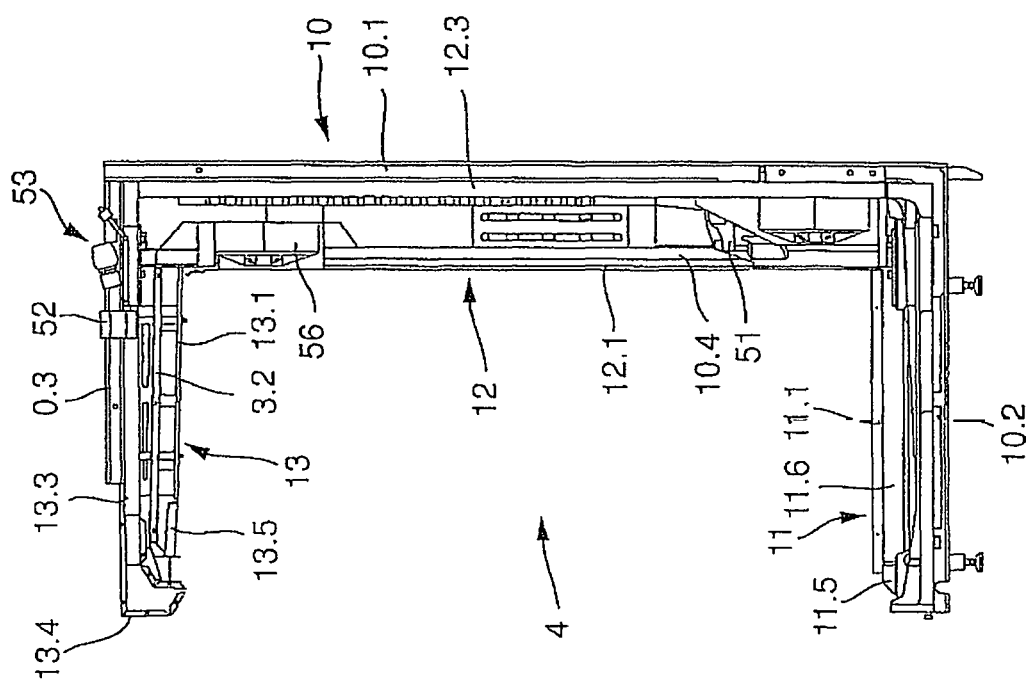

COOLING DEVICE

BACKGROUND OF THE INVENTION

Field of the Invention

This invention relates to a cooling unit with C-shaped side frames situated on both sides, which are composed of or include frame profiles and each have a rear vertical profile and an upper and lower horizontal profile protruding forward from this rear vertical profile. A rear wall group with a thermally insulating outer casing is mounted on the vertical profiles, a base group is mounted on the lower horizontal profiles, and an upper group is mounted on the upper horizontal profiles, and these groups enclose a cooling chamber from behind, below, and above.

Discussion of Related Art

A cooling unit of this kind is disclosed in German Patent Reference DE 10 2006 020 717 B3. In this known cooling device, a base unit, a rear wall unit, and an upper unit are mounted on a frame module that has two vertical frame profiles and upper and lower crossbars welded to these vertical frame profiles. The lower crossbar is slid into the base unit and can be screwed to it during assembly. A pedestal is mounted under a bottom pan of the base unit. As shown in this patent disclosure, the insulated bottom pan, an insulated rear wall part, and an insulated, formed ceiling, which have air flow routing parts, are mounted on the respective outside of the frame unit and on the inside of the unit, support elements for shelves are hooked into in openings of the frame profiles. In cooling units of this kind, it is problematic to achieve good thermal insulation while also achieving a simple, stable design.

Another cooling unit is disclosed in PCT Patent Reference WO 2012/025240 A2. This known cooling unit has a C-shaped design when viewed from the side, composed of a base group, a rear wall group, and an upper group into which the components of a cooling device are integrated. The base group, the rear wall group, and the upper group are composed of multiple layers that delimit intermediate spaces for routing an air flow. The design of such a cooling unit is relatively complex so that it is relatively expensive to construct.

A cooling device with a C-shaped design when viewed from the side and a system composed of such cooling units are also disclosed in European Patent Reference EP 2 190 321 B1.

SUMMARY OF THE INVENTION

One object of this invention is to provide a cooling unit of the type mentioned at the beginning that achieves a stable assembly with simple installation steps while also achieving an efficient cooling. This object and others of this invention are also to disclose a method for a simple assembly.

This object is attained with the features of this invention as described in this specification and the claims.

In the cooling device, at least the thermally insulating outer casing is mounted on the inside of the vertical profiles oriented toward the cooling chamber, directly or indirectly by an intermediate element.

These measures achieve an advantageous assembly with a stable design that functions well and has favorable insulating properties.

For lateral delimitation, side parts can be simply mounted or additional cooling units can be aligned in a row, and only the units at the ends are provided with side parts. The cooling chamber, which is possibly enlarged by aligning a plurality of cooling units in a row, is accessible from the front side, and depending on the use, the front side can be left open or can be closed with door elements.

With the method of this invention, two C-shaped side frames are produced, each with a vertical profile and an upper and lower horizontal profile protruding forward from this rear vertical profile. A deflector plate made of a thermally insulating material and belonging to a base group is mounted onto the lower horizontal profiles directly or indirectly by an intermediate element, a thermally insulating outer casing belonging to a rear wall group is mounted onto the front side of the vertical profiles directly or indirectly by an intermediate element, and a thermally insulating upper cover belonging to an upper group is mounted onto the underside of the upper horizontal profiles directly or indirectly by an intermediate element. Spaced apart from the top side of the deflector plate, the front side of the outer casing, and the underside of the upper cover, plate-shaped wall elements for routing an air flow are installed, where components of a cooling device are incorporated at least into the rear wall group. Support profiles are installed spaced apart from the front side of the vertical profiles in parallel fashion, between the rear regions of the upper and lower horizontal profiles. These measures allow the cooling unit to be constructed in a stable fashion with simple assembly steps.

A sturdy system composed of a plurality of cooling units is obtained if a plurality of cooling units that are aligned next to one another in a row and have the above-described structure are connected to one another at their adjacent side frames. Sealing components are inserted between the base groups, the rear wall groups, and the upper groups of adjacent cooling units.

It is also advantageous for the design and cooling function that the lower horizontal profiles are provided with feet for supporting them on the floor and for compensating for differences in height.

It is advantageous for the assembly and for a stable design that a support profile is built into each side frame between the upper and lower horizontal profile in the rear region, spaced apart from, and forward of the vertical profile.

Contributions to an energy-saving cooling function are made if each support profile composed of metal is installed so that it is supported in relation to the upper and lower horizontal profile without a metallic connection by thermally insulating intermediate pieces.

It is advantageous for the design and use if the support profiles are provided with rows of holes in a predetermined spacing pattern, into which support arms for shelves can be hooked that protrude forward into the cooling chamber.

Other measures that are advantageous for the function and design are present in the embodiment having a unit that is C-shaped when viewed from the side, with the base group, the rear wall group, and the upper group that enclose the cooling chamber from behind, below, and above and are provided with at least part of the components of a cooling device. On both sides, the unit has a C-shaped side frame composed of frame profiles, the rear wall group is provided on its back side with the thermally insulating plate-shaped outer casing that is connected to the two vertical profiles along its two vertical longitudinal edge regions, the base group has a thermally insulating deflector plate that is attached to the two lower horizontal profiles, and the upper group has a thermally insulating plate-shaped upper cover that is attached to the two upper horizontal profiles. The outer casing, the deflector plate, and the upper cover are each situated on the inside of the frame profiles oriented toward the cooling chamber.

Contributions to an advantageous function with a simple assembly of the cooling unit are made if the rear edge of the thermally insulating deflector plate attached to the two lower horizontal profiles adjoins the lower edge of the outer casing directly or indirectly by transition elements and the rear edge of the thermally insulating plate-shaped upper cover adjoins the upper edge of the outer casing directly or indirectly by other transition elements. These measures ensure an advantageous thermal insulation of the cooling chamber on its back side and in the upper region and base region.

Contributions to the cooling function and the design are also made by the fact that an evaporator or other heat exchanger for cooling the cooling chamber is situated or positioned in a chamber of the rear wall group between the front side of the outer casing and a plane formed by the front side of the support profiles and if the evaporator or other heat exchanger is attached to the front side of the outer casing by a support device.

The cooling function is also promoted if the chamber of the rear wall group also contains at least one fan for producing a cold air flow that is acted on with cooling power by the evaporator or other heat exchanger and at least part of this cold air flow is conveyed into the cooling chamber. Advantageously, the at least one fan is situated or positioned above the evaporator, thus avoiding an electrical malfunction or damage due to dripping fluid and achieving a uniform air flow through the gap between the vertically oriented fins of the evaporator without back pressure.

In one embodiment that is advantageous for the cooling function, the rear wall group, the base group, and/or the upper group has a layered structure with a plurality of plate-shaped wall elements that are spaced apart from one another, thus producing at least one intermediate space for routing an air flow.

In this case, the design and function are promoted if the respective plate-shaped wall elements are embodied on the outer casing, on the top side of the deflector plate, and/or on the underside of the upper cover, respectively on the side oriented toward the cooling chamber.

It is also advantageous for the design and function if the plate-shaped wall elements of the upper group are mounted by thermally insulating support pins that are fastened to the underside of the horizontal profiles on both sides.

An energy-efficient cooling is also promoted due to the fact that inner intermediate chambers that are close to the cooling chamber and connected to one another for a cold air flow and outer flow conduits that are spaced apart from the cooling chamber and connected to one another for a warm air flow are embodied in the rear wall group, the upper group, and the base group and the circulating air flows on the front side of the cooling unit produce a cold air loop by the cold air flow and a warm air loop by the warm air flow, achieving an insulation of the cooling chamber relative to the surroundings.

For a stable design of a system composed of a plurality of cooling units, it is advantageous if spacer elements are inserted between the adjacent side frames that are clamped to each other and that the sealing elements are inserted between the narrow edges that face one another on the thermally insulating outer casing, the thermally insulating deflector plates, and the thermally insulating upper cover.

BRIEF DESCRIPTION OF THE DRAWINGS

This invention is explained in greater detail in view of exemplary embodiments with reference to the drawings, wherein:

FIG. 3 shows a perspective view of a shelving module obliquely from the front and to the side in a depiction in which it is open at the side;

FIG. 4 shows an open side view of a shelving module;

DETAILED DESCRIPTION OF THE INVENTION

Figure 1:
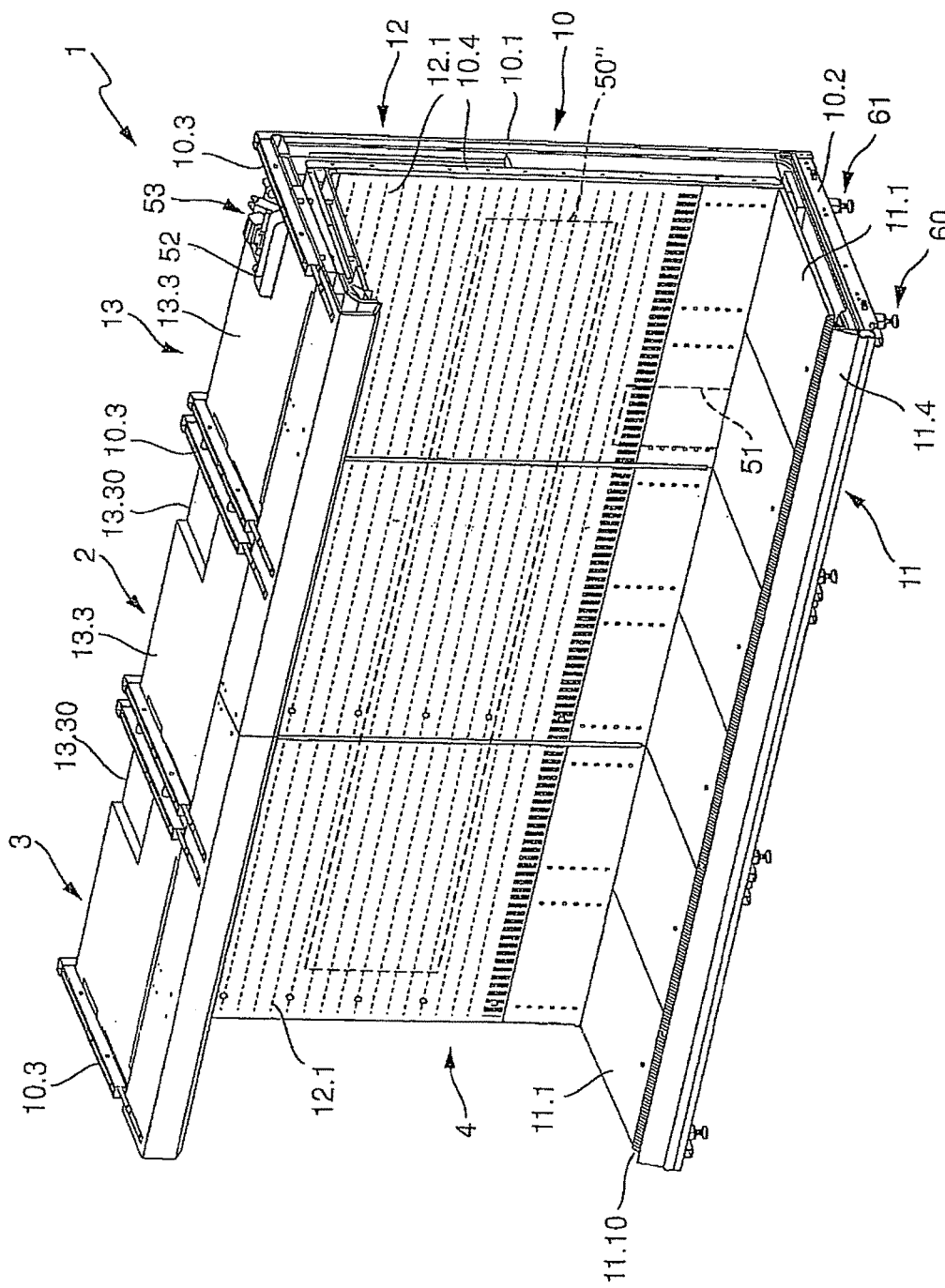
FIG. 1 shows three shelving modules aligned to form a cooling unit system, in the not yet fully assembled state, in a perspective view from the front and to the side.

FIG. 1 shows a unit composed of or comprising three shelving modules 1, 2, 3 combined into a cooling unit system. The cooling unit system encloses a frontally accessible cooling chamber 4 at the back, from above and below, and at least when in use, also from the side, for which purpose the two corresponding side walls are mounted on both sides of the system. The front side can be open and freely accessible or for special applications, can be provided with door elements. When in use, shelves are mounted in the cooling chamber 4, onto which the chilled goods, such as meats, dairy products, or the like, are placed in a sales room. A single shelving module 1, 2, 3 can be used as a cooling unit. Side walls can be mounted on both sides and the front side can be open or can be closed by at least one door element.

To keep the cooling chamber 4 cold, components of a cooling device 5 are integrated into the cooling unit system (see FIG. 2), in particular an evaporator 50, 50', 50", a compressor 51, a condenser 52, an expansion valve device, connectors 53 including connecting lines 53.1, and a control unit 55.1 of a control system 55 (see FIG. 8), as well as fans 56, 57 for producing or assisting required air flows (see FIG. 3). The condenser 52 can be connected by corresponding connecting lines 53.1 via a secondary circuit to a heat exchanger 54, such as located in another space. If necessary, it is also possible, for example, for a larger cooling unit system to include a plurality of such components of the cooling device 5.

In one version of the exemplary embodiment shown, the condenser 52 with corresponding connectors 53 is situated or positioned in or on an upper group 13 in an upper cooling component recess 13.30 situated there in the region of an upper cover 13.3 so that it is easily accessible from above or behind, while the compressor 51 is preferably situated in the lower region of a rear wall group 12, behind an inner cover 12.1 that delimits the cooling chamber 4 at the back, in a receiving space (not shown in detail) of a receiving device. In the middle region of the rear wall group 12, the evaporator 50, 50', 50" is likewise situated behind the inner cover 12.1 and is mounted with the receiving device. As clear from FIG. 1, the evaporator 50" extends continuously across all three shelving modules 1, 2, 3, while the compressor 51 and condenser 52 for all three shelving modules 1, 2, 3 of the cooling unit system are jointly situated in only one shelving module 1, in the exemplary embodiment according to FIG. 1 in the one on the right, and are connected to the evaporator 50" via corresponding connecting lines with the interconnection of relevant intermediate elements of the cooling device 5 such as expansion valves or restrictors.

Aside from the upper group 13 and rear wall group 12 mentioned above, each shelving module 1, 2, 3 also has a base group 11. With a floor cover 11.1 situated on top, it delimits the bottom of the cooling chamber 4 and at its front, has a covering grating 11.10, which is provided with air passage holes, in particular air passage slots, and a front cover 11.4 with a protective or decorative molding in the front edge region.

Essential components of each shelving module 1, 2, 3 are the side frames 10 situated on each side, which have a C-shaped form when viewed from the side, with a vertical profile 10.1 along the back side, a lower horizontal profile 10.2 connected to and extending forward from the bottom of the vertical profile, and an upper horizontal profile 10.3 connected to and extending forward from the upper end section of the vertical profile 10.1. In the depiction shown, the lower horizontal profile 10.2 extends farther forward than the upper horizontal profile 10.3. Further testing, however, has shown that an upper profile 10.3 that is exactly as long as or longer than the lower horizontal profile 10.2 can be advantageous, for example, to support a front part with a roller curtain and lighting system in a stable fashion, without flexing. A support profile 10.4 is installed in front of the vertical profile 10.1, spaced apart from it toward the front, between the lower and upper horizontal profile 10.2, 10.3. The lower horizontal profile 10.2 is supported on height-adjustable feet 60, 61. The two side frames 10 of each shelf module 1, 2, 3 support the base group 11 by their lower horizontal profiles 10.2, support the rear wall group 12 by their vertical profiles 10.1 and support profiles 10.4, and support the upper group 13 by their upper horizontal profiles 10.3 and produce a stable structure with simple assembly steps. They also make it possible to align a plurality of shelving modules 1, 2, 3 next to one another in a stable fashion or design to form the cooling unit system, it thus being possible to transport the cooling unit system as a stable unit by a hoisting device or vehicle.

Figure 2:
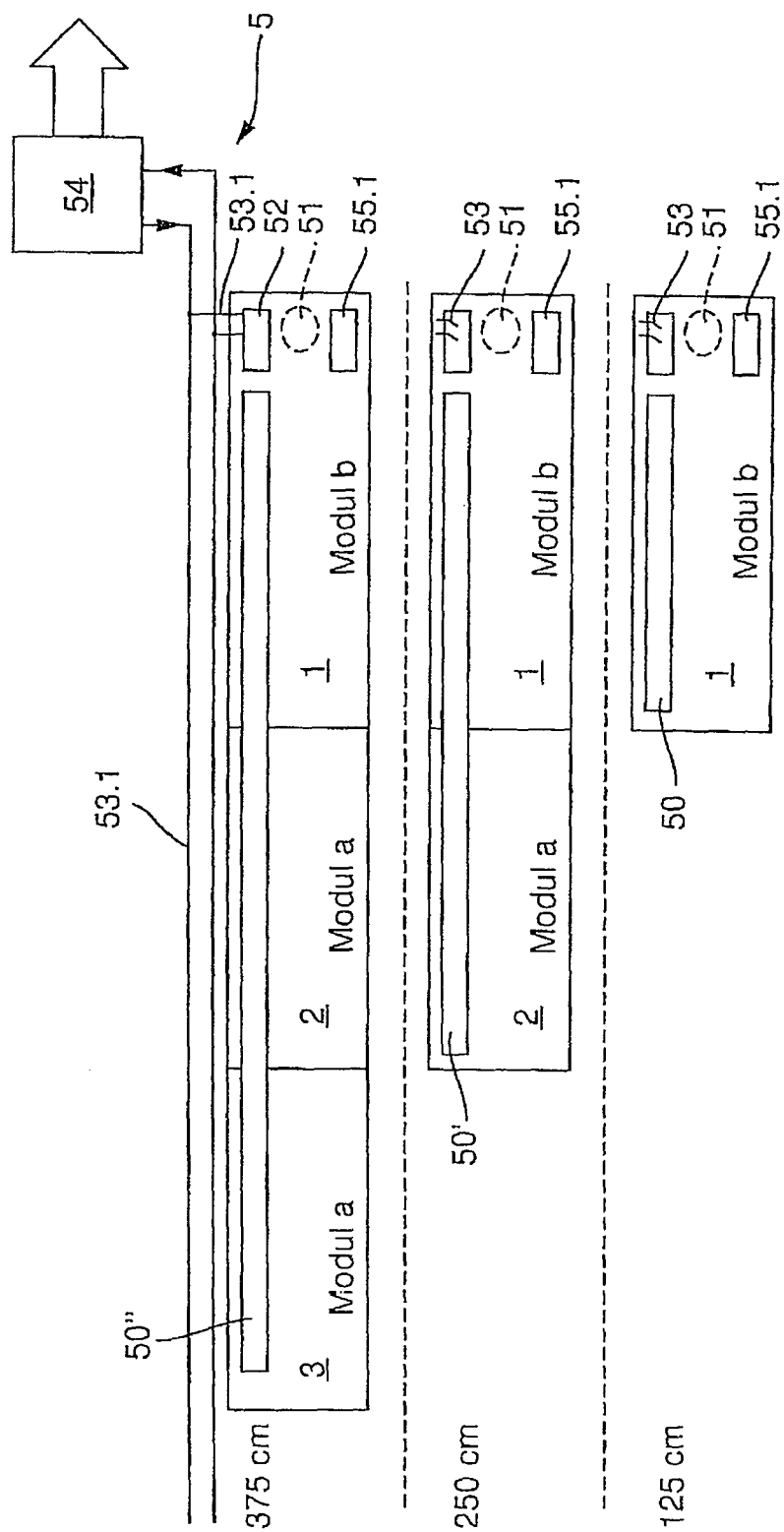
FIG. 2 is a schematic view of three cooling unit systems including one shelving module, two shelving modules, and three shelving modules, respectively, with schematically depicted components of a cooling device with a connection to a central heat exchanger.

As shown in FIG. 2, an advantageous exemplary embodiment of a cooling unit system comprises only one shelving module 1 with all of the components of a cooling device except for the possibly provided central heat exchanger 54, with relevant connecting lines 53.1 leading back and forth (module of design type b), while the other shelving modules of a cooling unit system are only provided with an evaporator 50, 50', 50", with the evaporator 50', 50" advantageously but not necessarily being embodied in the form of a continuous unit (modules of design type a). The evaporator in modules of design type a is connected via corresponding connectors 53 including connecting lines 53.1 and possibly electrical cabling for a signal transmission (sensors, control) and electrical energy supply to the remaining relevant components of the cooling device in the shelving module 1 of design type b. All of the shelving modules 1, 2, 3, however, are prepared in the same way for accommodating all of the required components of the cooling device 5 and also with pre-installed sections of the connecting lines 53.1 and connectors for a fast, easy connection between the cooling components of the shelving modules and possibly with the central heat exchanger 54 so that with little assembly effort, modules of one design type can be converted into a module of the other design type or possibly even of yet another design type with different or additional components of the cooling device. It is also possible, for example in a cooling unit system with a large number of shelving modules, for there to be more than only one shelving module of design type b or of a design type with additional components of the cooling device.

An evaporator 50', 50" extending across a plurality of shelving modules 1, 2, 3 can also be subsequently inserted with relative ease between the relevant vertical profiles 10.1 and support profiles 10.4 that are spaced apart from them and fastened to the vertical profiles and/or to an intermediate partition, in particular an intermediate wall 12.2. The subsequent installation takes place, for example, by inserting the heat exchanger, in particular the evaporator 50, 50', 50", from a side parallel to the plane of the rear wall or from the front, after the removal of relevant support profiles 10.4, which are then reinstalled. As described in greater detail below, the particular assembly method of the support profiles 10.4 permits a simple installation and removal.

As evident from FIG. 2, with the design shown, only one shelving module 1 needs to be connected to the central heat exchanger 54 with the prepared connectors 53, which include quick couplings and controllable valves, for example, while the other shelving modules 2, 3 need only be simply connected to one another via the integrated connector 53. In this case, the central heat exchanger 54 is generally connected via a secondary circuit to the condenser 52 of the relevant shelving module 1 (design type b). A different refrigerant is used in the secondary circuit than in the cooling unit system. For example, a compact plate- or tube heat exchanger can be used for the condenser 52. In the central heat exchanger 54, incoming heat can be removed for another use of the thermal energy, as indicated by the arrow at the top right.

Figure 10:
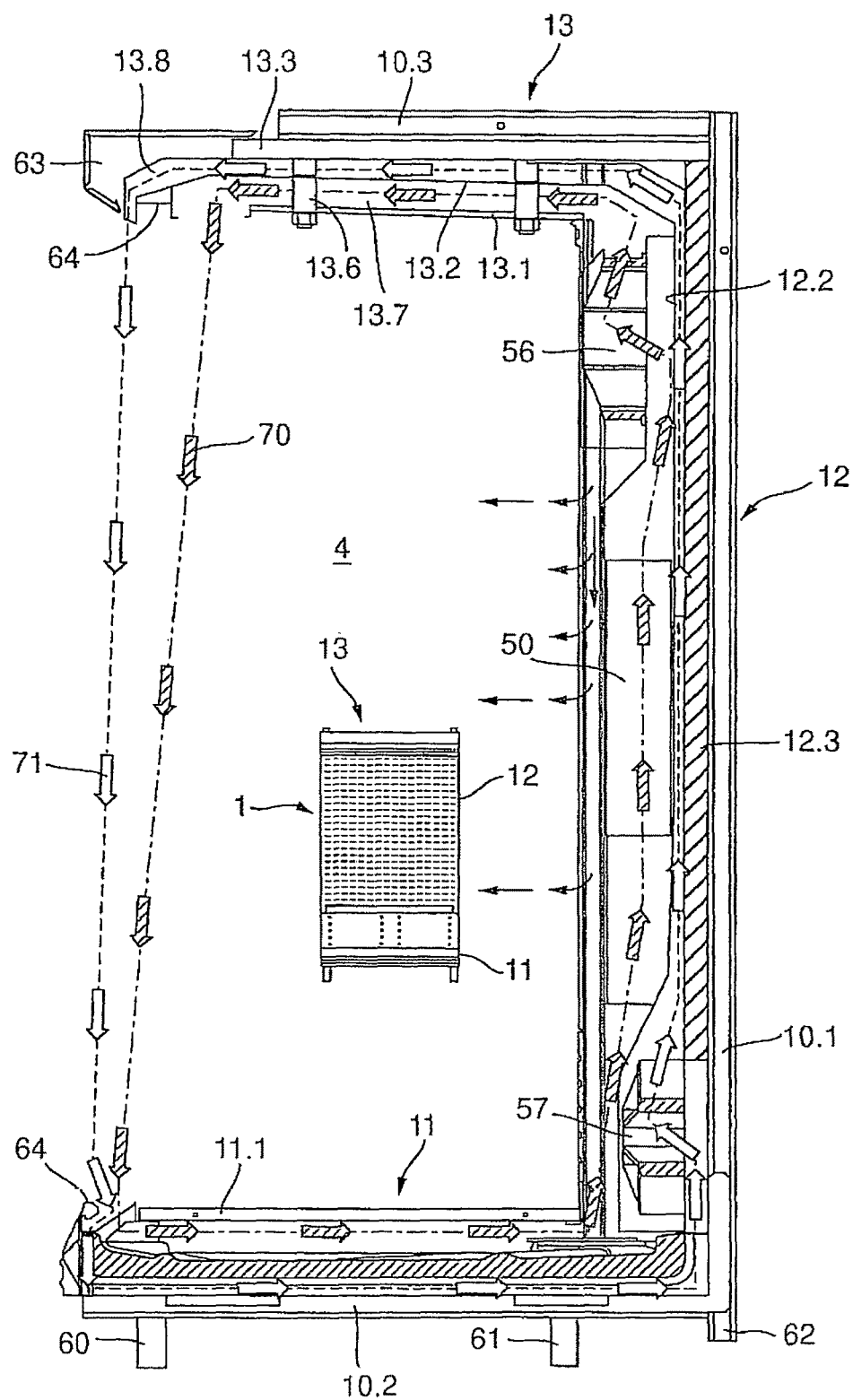
FIG. 10 shows a schematic view of a shelving module in a cross-section viewed from the side.

As shown in FIGS. 3 and 4, the base group 11, the rear wall group 12, and the upper group 13 are embodied of multiple layers with intermediate spaces embodied therein for the air flow routing. The air flow routing is produced or assisted by fans 56, 57, which are embodied in the form of radial fans or diagonal fans and of which, in the exemplary embodiment shown, one is situated in the lower region of the rear wall group 12 and one is situated in its upper region or alternatively two are situated in the upper region of the rear wall group 12. The upper fan or fans 56 in this case each produces the air flow through the evaporator 50, 50, 50" from bottom to top, as indicated in FIG. 10. In this case, a part of the cooling air flow produced by the evaporator 50, 50', 50" conveyed farther downward on the back side of the inner cover 12.1 and flows through the ventilation slots provided in the inner cover 12.1 into the cooling chamber 4 in order to keep the latter at the required refrigeration temperature. In order to achieve an optimum cooling, this cooling air flow that is conveyed into the cooling chamber 4 can be fanned out and suitably adapted, for example by reducing the flow resistance toward the bottom. Another part of the cooling air flow is conveyed via the upper fan(s) 56 through the vertical inner intermediate space 12.4 of the rear wall group 12 into an upward intermediate space 13.7 connected thereto in the upper group 13, along the top of a lower cover 13.1 that delimits the cooling chamber 4 at the top, to a front top section 13.4, where at the underside of the latter, it emerges from a slit-like outlet opening 13.50 with an outlet grating 13.5 and forms a cold air curtain 70 on the front side (see FIG. 10). In the front region of the base group 11, the air flow of the cold air curtain 70 then travels through an inlet opening 11.11 which is provided there, is covered by a covering grating 11.10, and extends along the front side and back into the intermediate space 11.6 below the floor cover 11.1 in order to then once again flow through the inner vertical intermediate space 12.4 of the rear wall group 12 fluidically connected to it in the circuit through the evaporator and the upper fan 56. In order to ensure a good transmission of the cooling power toward the cooling chamber 4, the floor cover 11.1, the inner cover 12.1, and the lower cover 13.1 of the upper group 13 are composed of or comprise thin-walled plates, in particular of metal or plastic, which are also easy to handle and clean. The plates of the floor cover 11.1 are advantageously segmented in the width direction and extend from the inlet opening 11.11 in the frontal region of the base group 11 to the lower region of the inner cover 12.1 of the rear wall group 12. The plates of the inner cover 12.1 of the rear wall group 12 are advantageously segmented in the vertical direction and extend across the entire width between the two side frames 10 of a shelving module 1, 2, 3. A plurality of plates situated one on top of the other vertically can be inserted or removed in an easily maneuverable way in order to uncover, clean, install, or remove relevant components of the cooling device 5.

Figure 5:
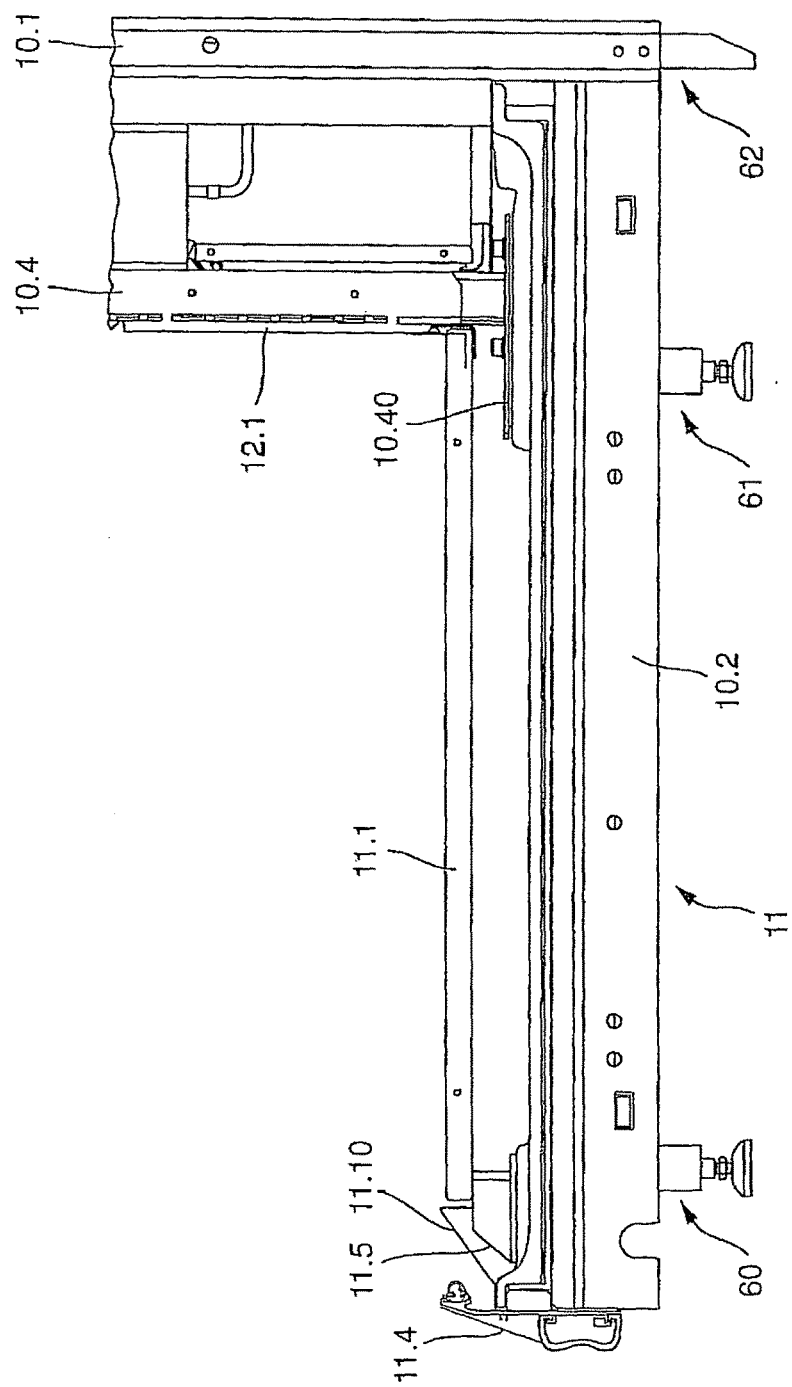
FIG. 5 shows an open side view of a lower section of a shelving module.
Figure 6:
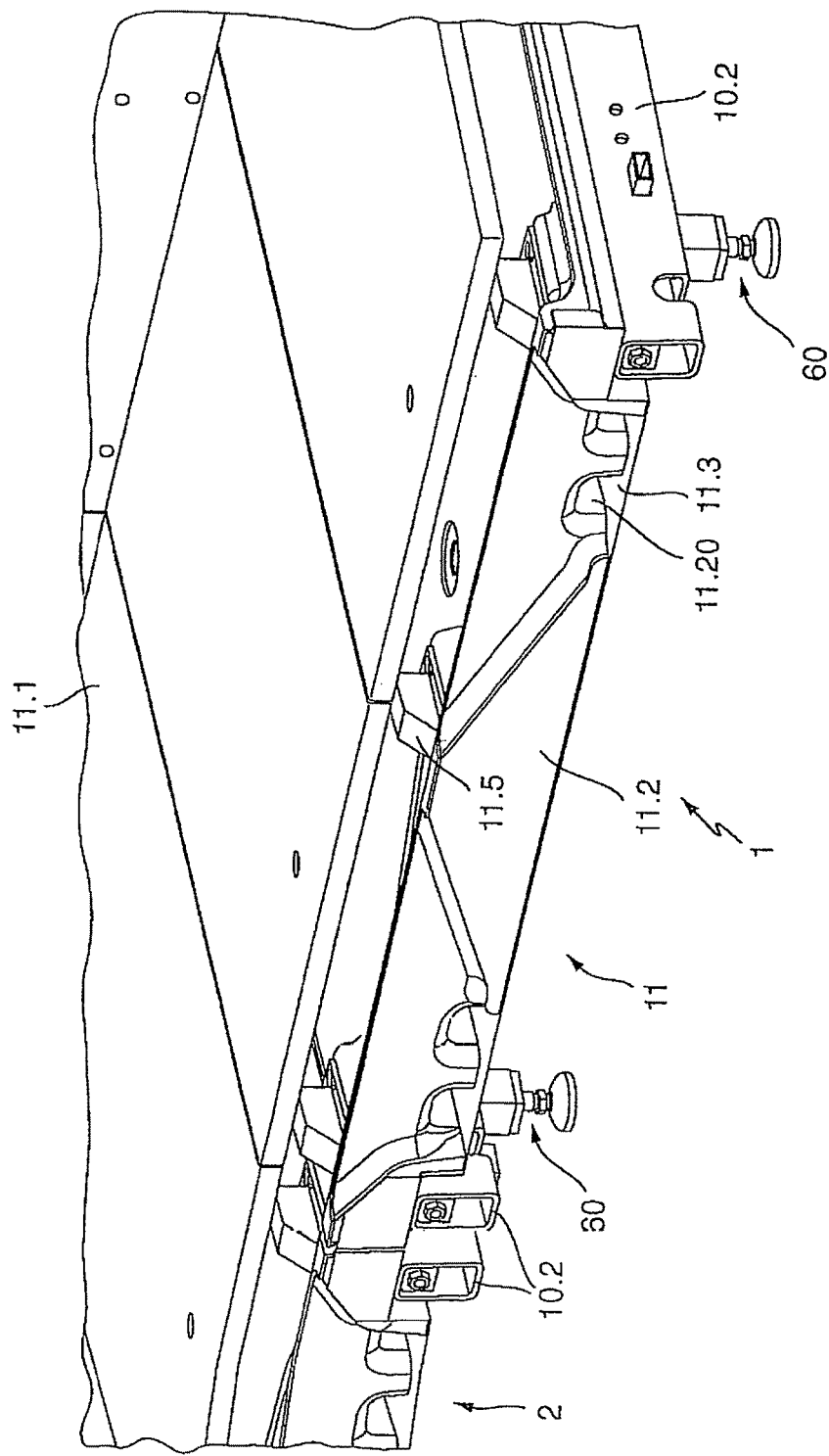
FIG. 6 shows a front, bottom corner region of a cooling unit system in a perspective view obliquely from the front, above, and to the side.
Figure 7:
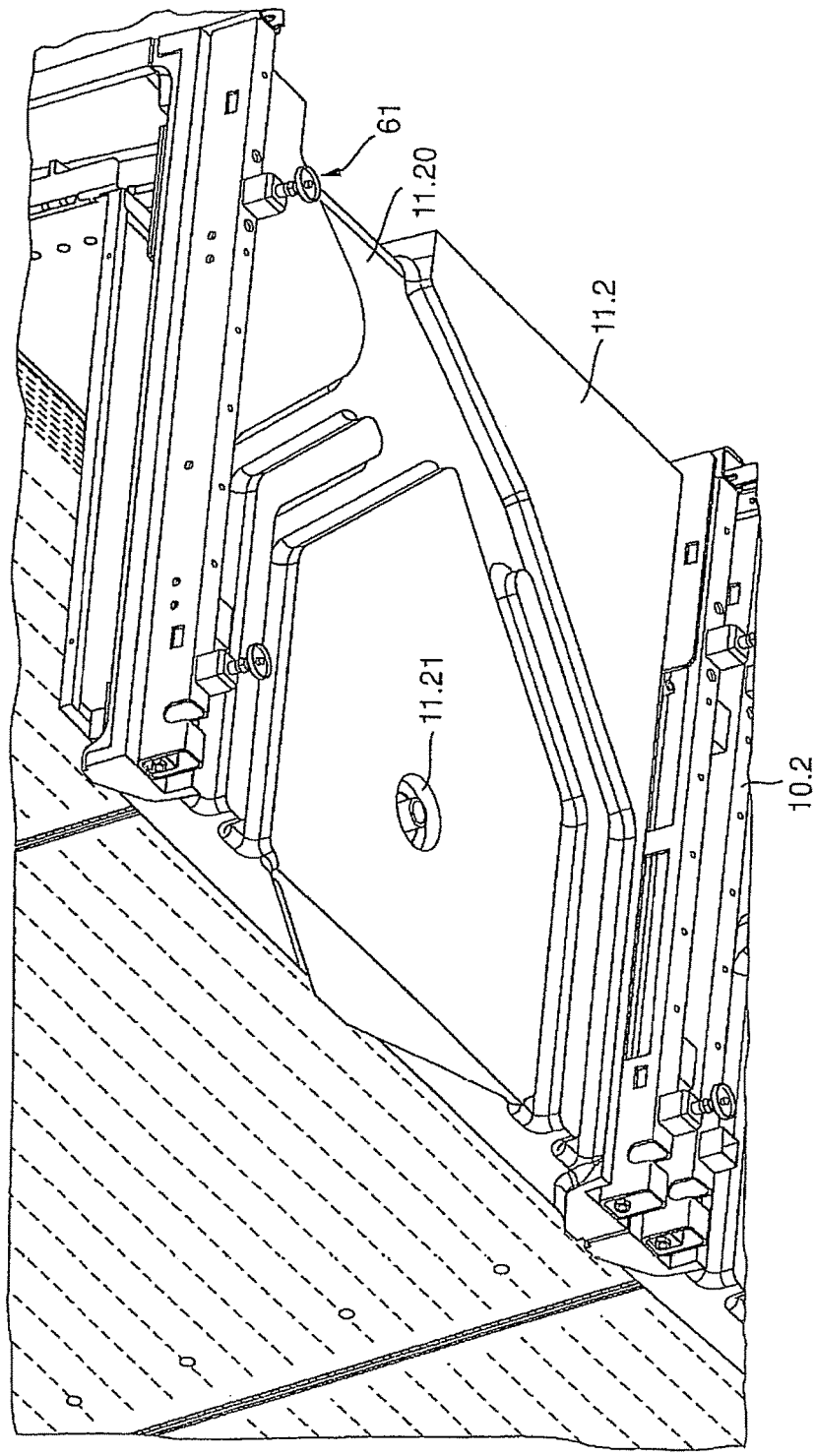
FIG. 7 shows a bottom corner region of a cooling unit system with the bottom base plate removed, in a perspective view obliquely from the front, below, and to the side.

As shown in greater detail from FIGS. 5, 6, and 7, the floor cover 11.1 is placed onto a plurality of block-shaped support elements 11.5 in the front region, such as plastic blocks composed of or comprising hard plastic, and are placed onto other support elements in the rear region, which are embodied, for example, in the form of support angles with forward-protruding support legs, particularly embodied in the form of an angled strip mounted to the lower section of the support profiles 10.4 of the two side frames 10.

Under the intermediate space 11.6 situated beneath the floor cover 11.1, there is a deflector plate 11.2 composed of or comprising heat-insulating and sound-insulating material, the top of which simultaneously serves as a catch basin for liquid that forms and has a drain hole 11.21, to which a drainpipe system is connected. On the underside, the deflector plate 11.2 is provided with a system 11.20 of molded conduits by which, beneath the deflector plate 11.2, a lower, outer horizontal intermediate space is embodied in the form of a lower, outer air flow conduit 11.7, which is covered at the bottom by a base plate 11.3 or a plurality of partial base plates or cover plates on the underside of the base group 11.

As shown in FIGS. 6 and 7, a plurality of conduits of the system 11.20 of molded conduits leading from respective inlet openings 11.70 are brought together at the rear of the deflector plate 11.2 on its underside and transition via a relatively wide recess or molded area of the deflector plate 11.2 into a rear, outer vertical intermediate space or outer vertical flow conduit 12.5 of the rear wall group 12 fluidically connected to them, which is embodied between the front side of the outer casing 12.3 and an intermediate partition with an intermediate wall 12.2 between the outer casing 12.3 and the inner cover 12.1, as is also shown by FIG. 3 and partially by FIG. 10. In order to produce the transition between the lower outer air flow conduit 11.7 and the lower section of the outer vertical flow conduit 12.5, the lower region of the relatively thick-walled insulating outer casing 12.3 can be cut out and, for example, only a thin cover plate can be left, which covers an insulation layer of the outer casing 12.3 on the back side. The recess in the insulating outer casing 12.3 can, for example, be produced by subsequently cutting it out from the front, thin cover plate and the insulation layer or even during the manufacture by leaving this region free during the foaming and recessing of the front cover plate. In this way, the transition and a lower section of the vertical outer flow conduit 12.5 can be suitably positioned and can pass, for example, downstream of the lower fan 57 and to one side of a compressor accommodated in the lower region of the rear wall group 12 (see FIG. 1). Then, the vertical outer flow conduit 12.5 is spread out toward the top over the entire width of the rear wall group 12 by baffle elements.

Figure 8:
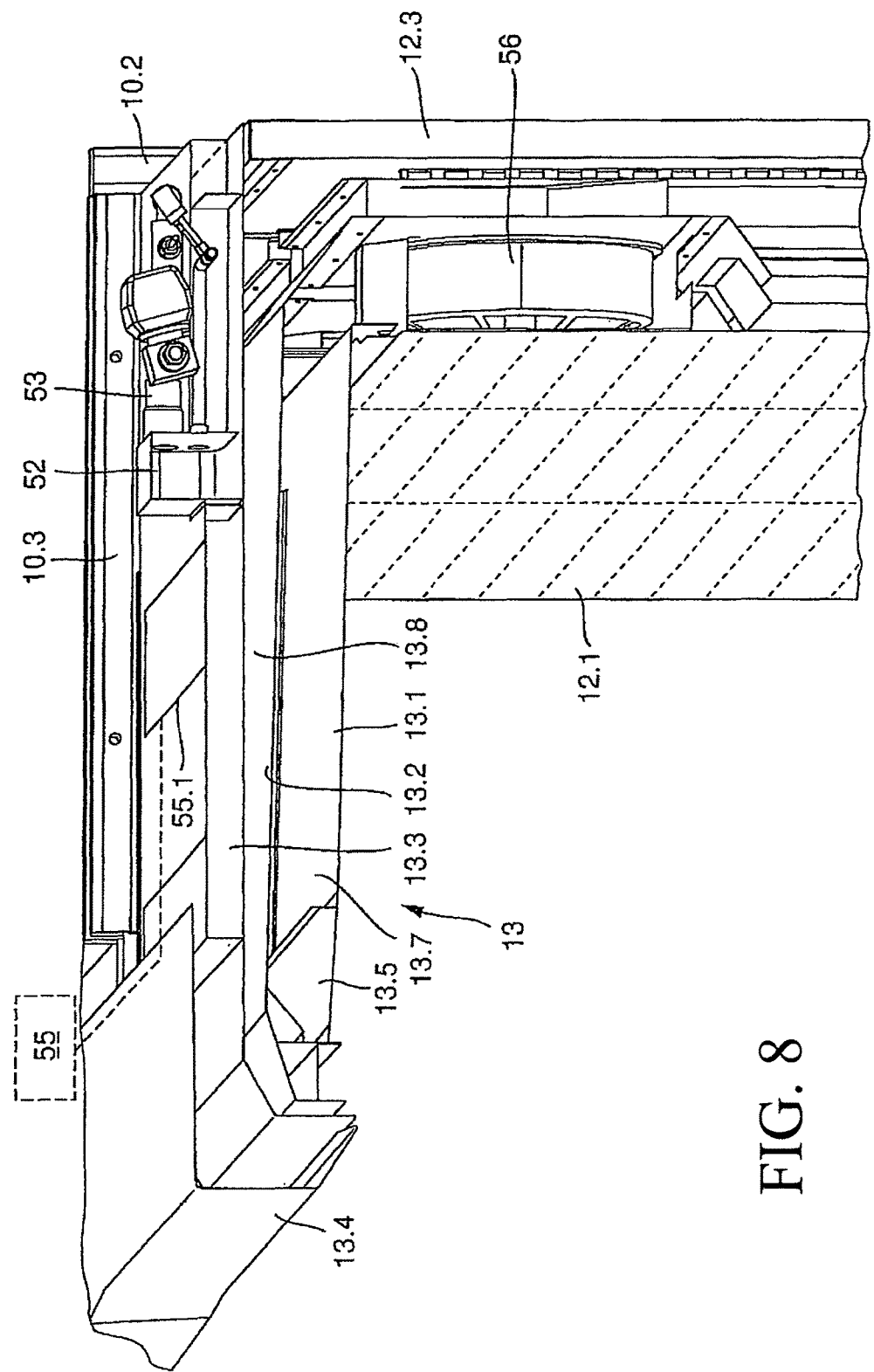
FIG. 8 shows an upper section of a shelving module, in a perspective view obliquely from the front, above, and to the side.
Figure 9A:
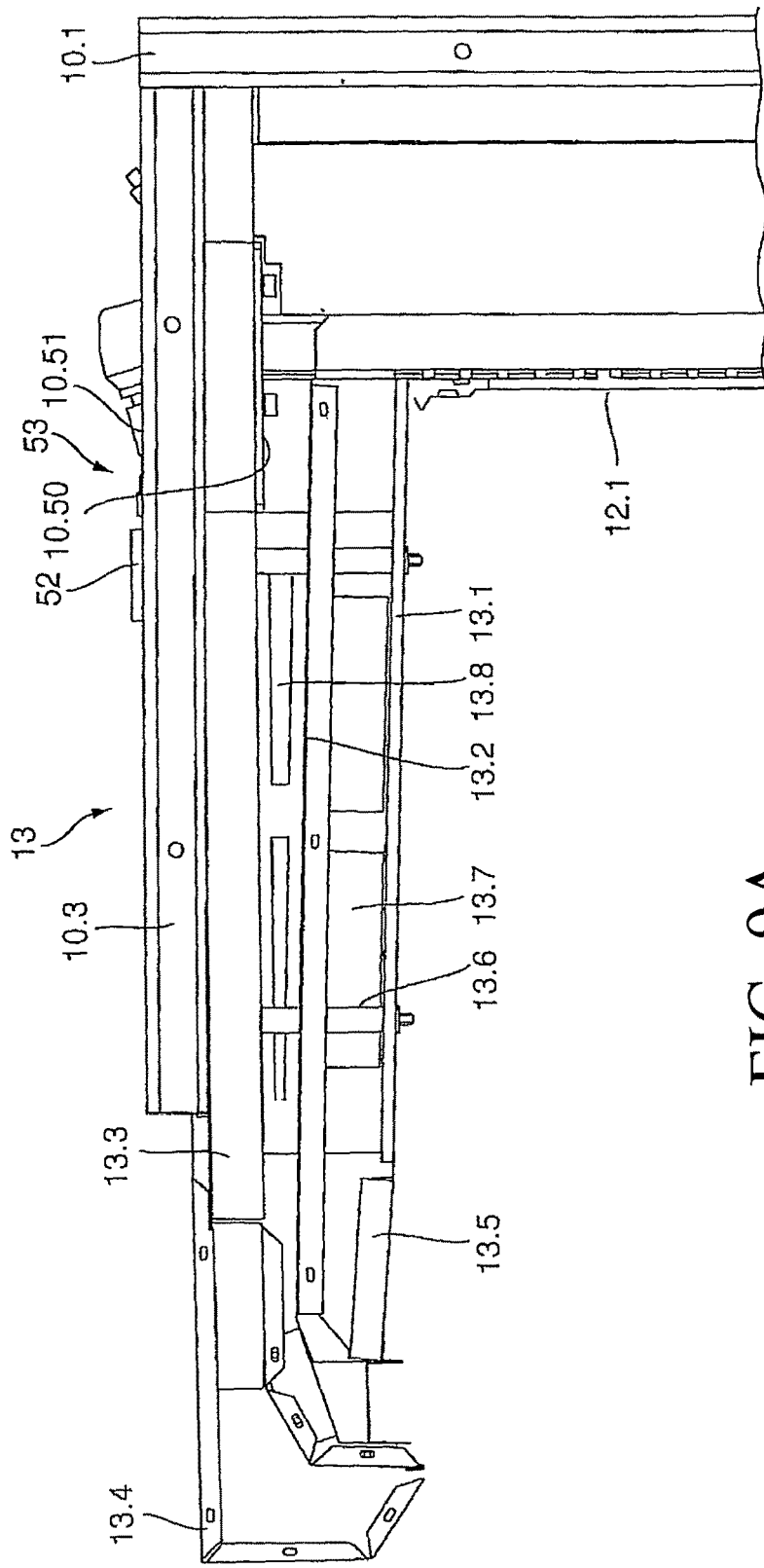
FIG. 9A shows an open side view of an upper section of a shelving module.

The fan 57 situated in the lower region of the rear wall group 12 is situated in the outer vertical intermediate space or in the vertical outer flow conduit 12.5 formed by it, which extends upward through the intermediate partition with the intermediate wall 12.2 behind the evaporator 50, 50, 50" and in front of the outer casing 12.3 and is connected to an outer upper intermediate space or outer upper flow conduit 13.8, forming a fluidic connection, as is clear from FIGS. 8 and 9A in connection with FIG. 10. In the upper group 13, the outer upper flow conduit 13.8 is divided from the inner upper flow conduit 13.7 by an intermediate cover 13.2 and extends between the intermediate cover 13.2 and the underside of the upper cover 13.3 to the front top section 13.4 and exits from the latter through an outlet slit 13.80 provided on the underside, spaced apart from the outlet opening 13.50 with the outlet grating 13.5, in order to form, on the front side of the relevant shelving module 1, 2, 3 or cooling unit system, a warm air curtain 71 situated in front of the cold air curtain 70. In the front region of the base group 11, the air flow produced by the warm air curtain 71 enters a slit-like inlet opening situated in front of the cover grating 11.10, into the lower outer intermediate space or lower outer flow conduit in order to form a warm air circuit.

As shown in FIGS. 9A and 10, the lower cover 13.1, the intermediate cover 13.2, and the upper cover 13.4 in the upper group 13 are held apart from one another by a plurality of jointly used support pins 13.6 in order to form the inner upper intermediate space 13.7 and the outer upper flow conduit 13.8. The upper cover 13.3 in this case is embodied in a thermally insulated way in the form of an insulating plate composed of or comprising insulation, for example in a way that corresponds to that of the outer casing 12.3. The insulating cover 13.3, together with the insulating outer casing 12.3 of the rear wall group 12 and the insulating deflector plate 11.2 of the base group 11, forms a shell-like thermal insulation.

In the exemplary embodiment shown, the insulating outer casing 12.3 of the rear wall group 12, the insulating upper cover 13.3 of the upper group 13, and the insulating deflector plate 11.2 of the base group 11 are each mounted to the inside of the vertical profile 10.1 oriented toward the cooling chamber 4, to the upper horizontal profiles 10.3, and to the lower horizontal profiles 10.2, respectively, of the associated side frames 10. At least on the inside oriented toward the cooling chamber numeral 4, the outer casing 12.3 is provided with a stable covering or is entirely embodied in the form of a stable, load-bearing plate so as to permit the intermediate wall 12.2 of the intermediate partition to be mounted thereon in a stable fashion, for example by a vertical spacer profiles that have an H-shaped cross-section, with the relevant spacing for the outer vertical intermediate space. The intermediate wall 12.2 can be bent at the vertical edges, such as in a Z shape, with end sections protruding outward in a flange-like fashion, and can be fastened to the side of the outer casing 12.3 oriented toward the cooling chamber 4, such as by screws or rivets.

The intermediate wall 12.2, which is composed of or comprises sheet steel or another suitable metal, offers a stable support base for the attachment of the evaporator 50, 50', 50", which advantageously extends across a plurality of shelving modules 1, 2, 3, as described above. The evaporator 50, 50', 50", which can be composed of or comprises sections associated with the shelving modules 1, 2, 3, is thus situated in the region of the cooling air conduit in front of the warm air conduit and is mounted there in stable fashion by connectors of the receiving device, such as by fastening screws and fastening lugs. In an evaporator 50, 50' 50" extending across a plurality of shelving modules 1, 2, 3, there is enough space provided at least on one side, (for example, see FIG. 1) so that connectors can be placed in this region for connecting lines for the refrigerant supply and for the injection of the refrigerant, such as a plurality of injection valves of the injection system, for the evaporation. The evaporator 50, 50', 50" in this case is not fastened to the frame profiles or support profiles so that on the one hand, no thermal transmission to the outside via the frame occurs and on the other hand, the support profiles 10.4 can be installed and removed without hindrance.

In alternative exemplary embodiments, in lieu of an evaporator for the cooling, it is also possible for another heat exchanger to be built into the rear wall group 12 or the upper region of the cooling unit, with the refrigerant advantageously being cooled in a remotely positioned central heat exchanger (such as with a water chiller).

Figure 9B:
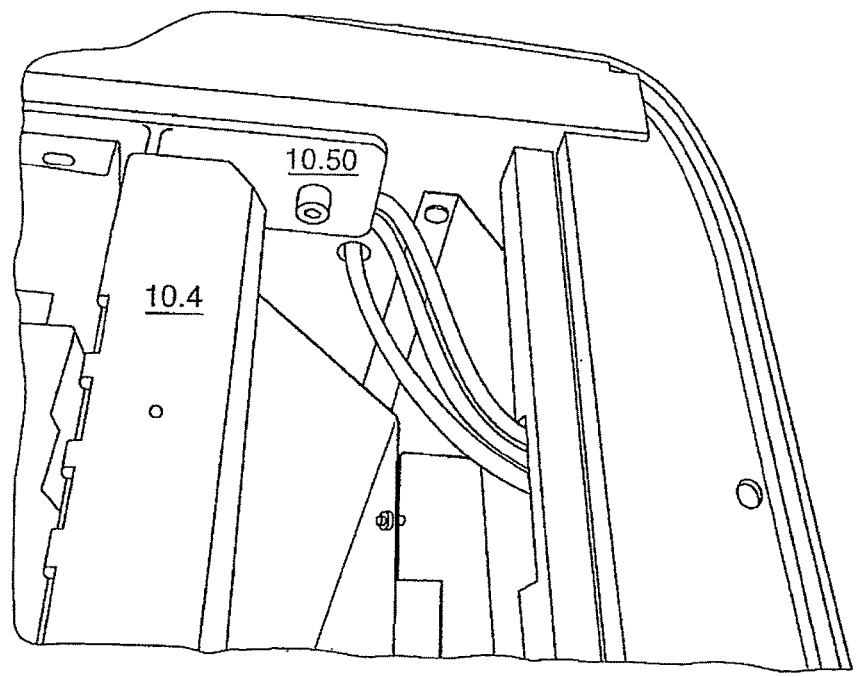
FIGS. 9B and 9C show an upper and lower corner region, respectively, of a shelving module in a perspective view.
Figure 9C:
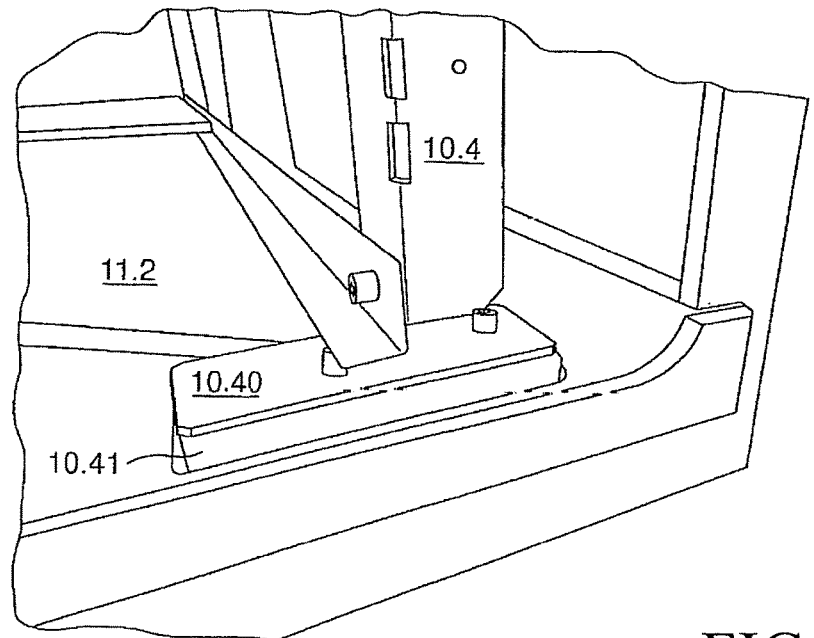

The support profile 10.4 is screwed to and supported on the underside of the upper horizontal profile 10.3 of the side frame 10 in stable fashion by an intermediate piece that is elongated from front to back and an upper support plate 10.50 (see FIG. 9B). As already shown in FIG. 5 and illustrated in FIGS. 9B and 9C, on its underside, the support profile 10.4 is supported by a support plate 10.40 that extends from front to back relative to the top of the lower horizontal profile 10.2 of the relevant side frame 10. Advantageously, an intermediate piece 10.41 made of hard plastic is inserted, which produces both a thermal insulation and a sound installation. This attachment permits the support profiles 10.4 to be easily installed and removed. In this case, the fastening elements for attaching the intermediate pieces to the horizontal profiles 10.2, 10.3 on the one hand and for attaching the support plate 10.40, 10.50 of the support profiles 10.4 to the intermediate pieces on the other hand are offset so that no continuous metallic thermally conductive contact is produced between the support profile 10.4 and the horizontal frame profiles 10.2 and 10.3.

The metallic support profiles 10.4 are provided with rows of holes in a predetermined, preferably standardized, spacing pattern, in which the plates of the inner cover 12.1 of the rear wall group 12 are accommodated so that they can be easily hooked and unhooked. In addition, support arms for the shelves can easily be hooked into the support profiles at the desired height.

Anti-tipping devices 62 protruding downward are mounted at the lower end section of the vertical profiles 10.1, which advantageously permit an adaptation to uneven floors, for example by resilient or elastic intermediate elements and/or adjusting elements. A lighting device 64 can be positioned in the front region of the base group 11 and/or upper group 13. Advantageously, a roller curtain 63 is situated in the front, upper region in order to close the cooling chamber at the front, for example during non-business hours, and thus to save cooling energy.

Sealing components are installed at the sides in order to seal the intermediate spaces in the base groups 11, rear wall groups 12, and upper groups 13 of the shelving modules 1, 2, 3.

In this case, the sealing components are advantageously inserted, for example, between the adjacent outer casings 12.3, the upper covers 13.3, and particularly also between the deflector plates 11.2. Additional sealing elements can in fact or solely be situated between the side frames 10 of adjacent shelving modules 1, 2, 3 aligned next to one another in order to seal the cooling chamber 4 between the shelving modules 1, 2, 3, but the side frames 10 are clamped to one another in a stable fashion and with a definite positioning, preferably only by interposed spacer elements such as spacer sleeves. Various embodiments of sealing elements can be used for the sealing components, for example sealing strips with a mushroom-shaped cross-section and leaves.

Various lateral partitioning elements can be used for laterally sealing the inner intermediate spaces 11.6, 12.4, 13.7 for the cold air flow and the outer flow conduits 11.7, 12.5, 13.8 for the warm air flow. In an exemplary embodiment that has been tested in an experimental setup, with a plurality of shelving modules 1, 2, 3 in a row, the inner intermediate spaces 12.4 of the rear wall group 12 are continuously connected to one another across the entire cooling unit system and only terminated in a sealed fashion at the two ends of the cooling unit system by relevant partitioning elements. This has one advantage of not hindering the use of a continuous evaporator 50', 50". By contrast, in an advantageous embodiment, the inner intermediate spaces 11.6 and 13.7 of the base group 11 and upper group 13 are partitioned on both sides of each shelving module 1, 2, 3 and are connected to the vertical, inner intermediate space 12.4 by appropriate air baffle plates in order to avoid disadvantageous flow leakages. The inner cover 12.1 of the rear wall group 12 is supplemented by intermediate plates in the transition region between the aligned shelving modules 1, 2, 3.

In the tested exemplary embodiment, the outer flow conduits 11.7, 12.5, 13.8 are respectively partitioned for each shelving module 1, 2, 3. In the rear wall group 12, this occurs in the region of or near the intermediate wall 12.2, for example by its lateral edges or by inserted strips, and correspondingly also in the region of the upper group 13 and in the region of the base group 11, for example by the molded indentations on the underside of the deflector plate 11.2.

Figure 11A:
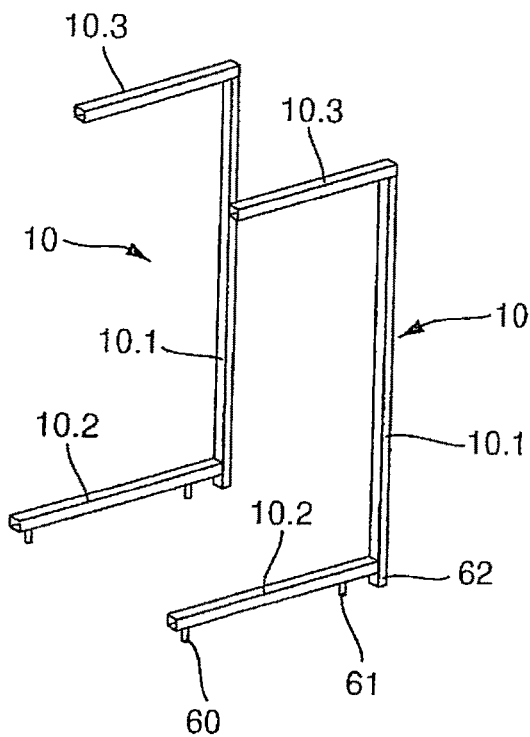
FIGS. 11A through 11X show different depictions of assembly steps of a shelving module according to different embodiments of this invention.
Figure 11B:
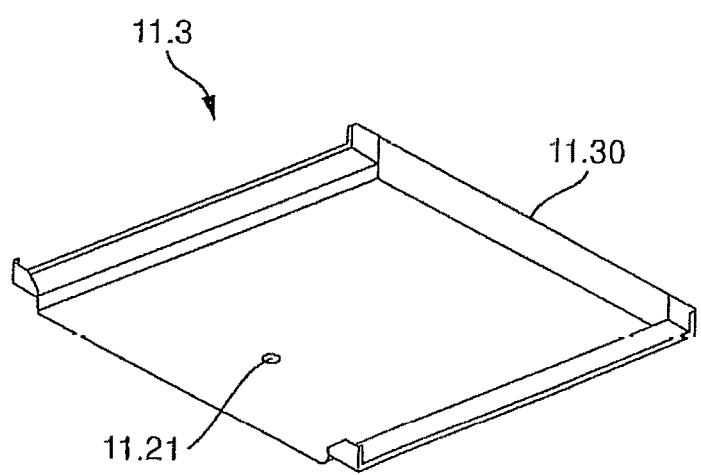
Figure 11C:
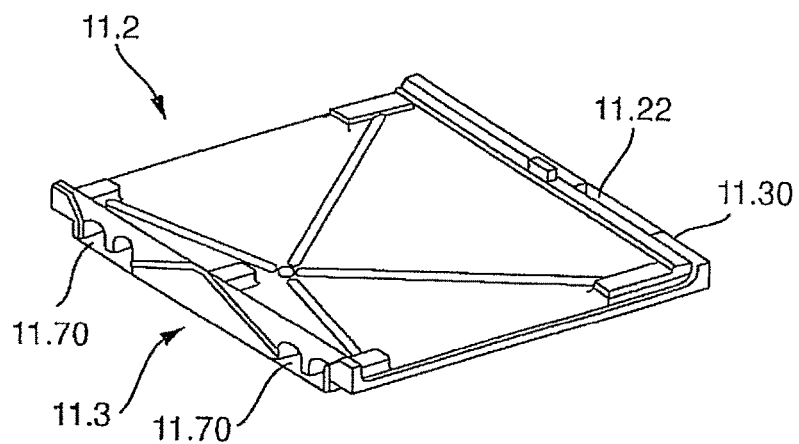
Figure 11D:
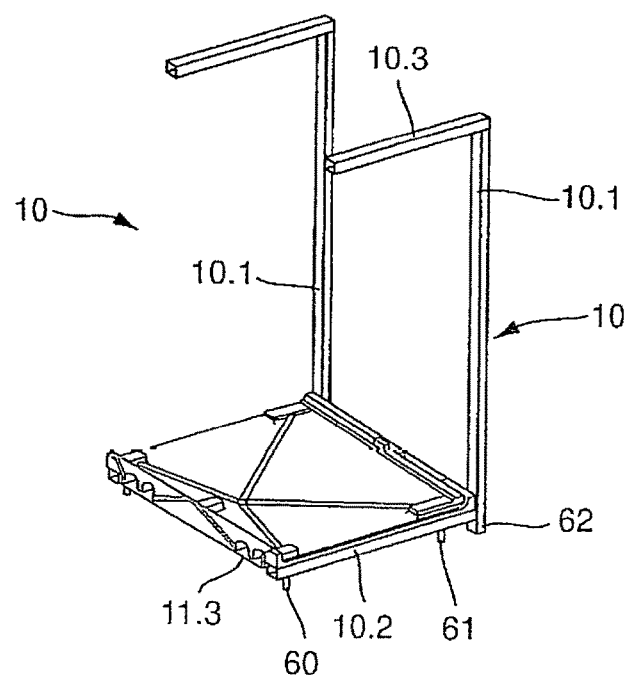
Figure 11E:
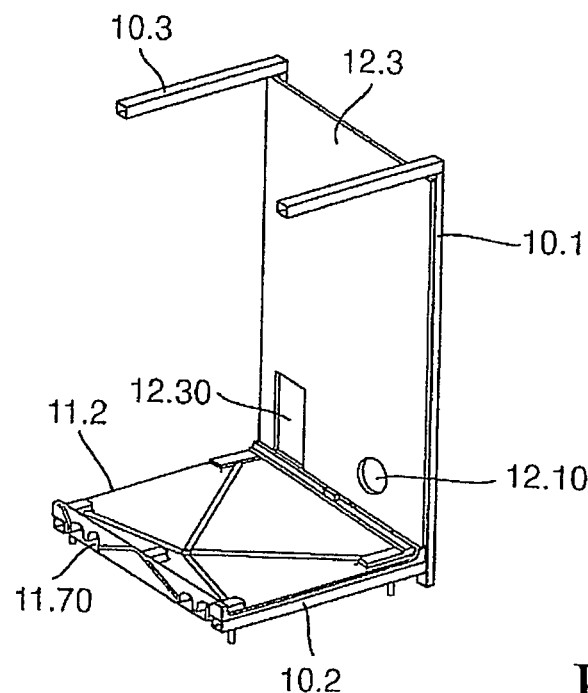
Figure 11F:
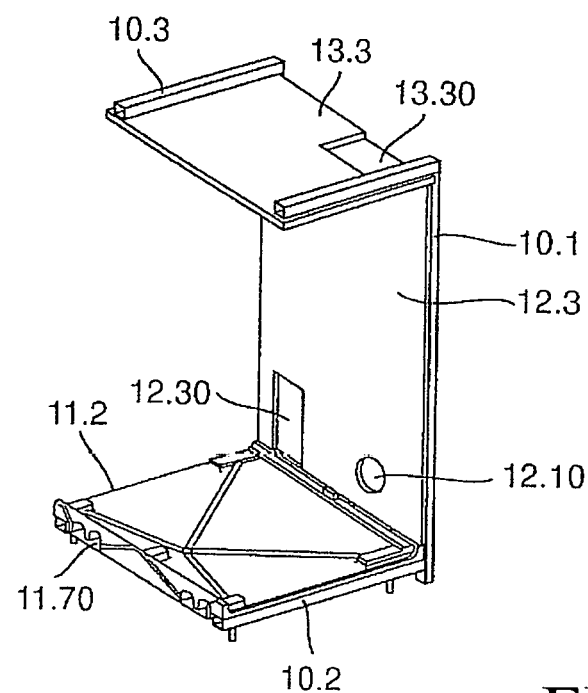
Figure 11G:
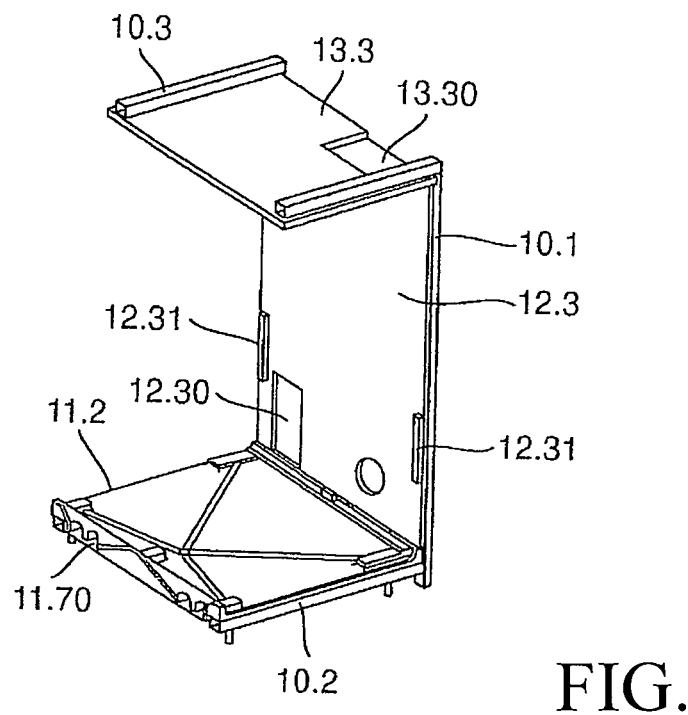
Figure 11H:
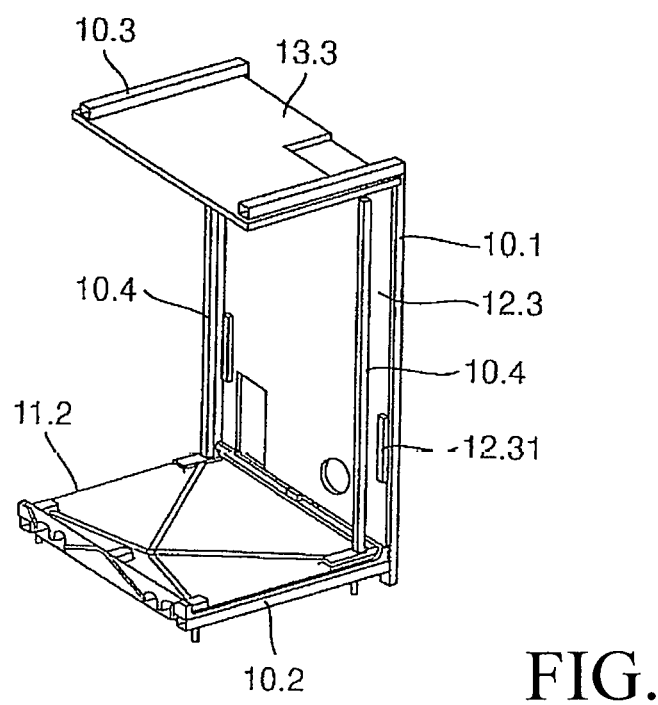
Figure 11I:
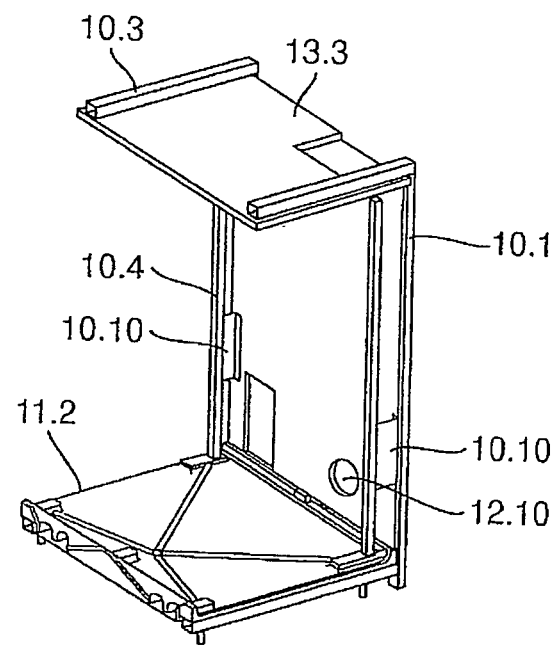
Figure 11J:
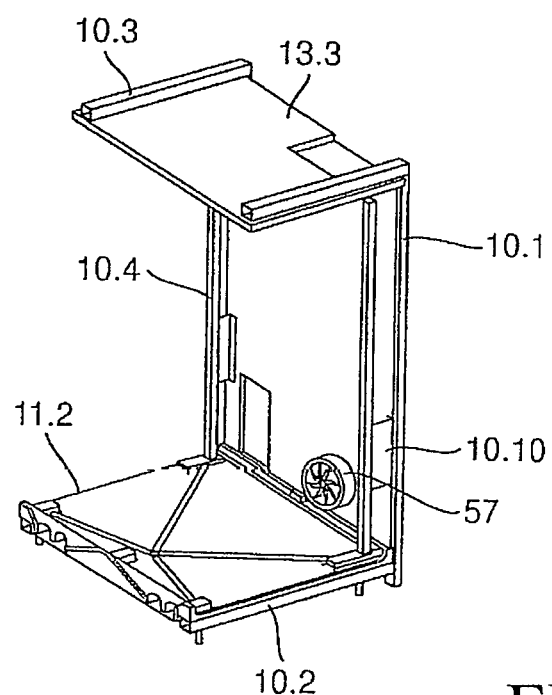
Figure 11K:
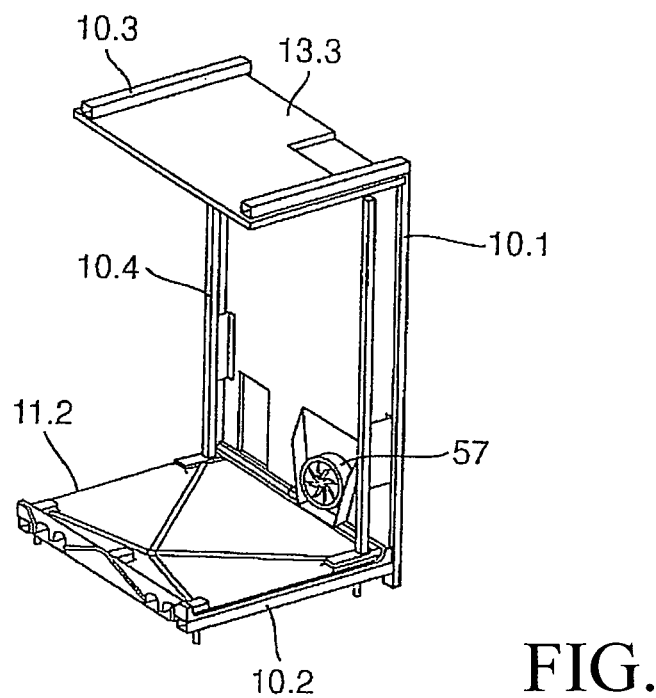
Figure 11L:
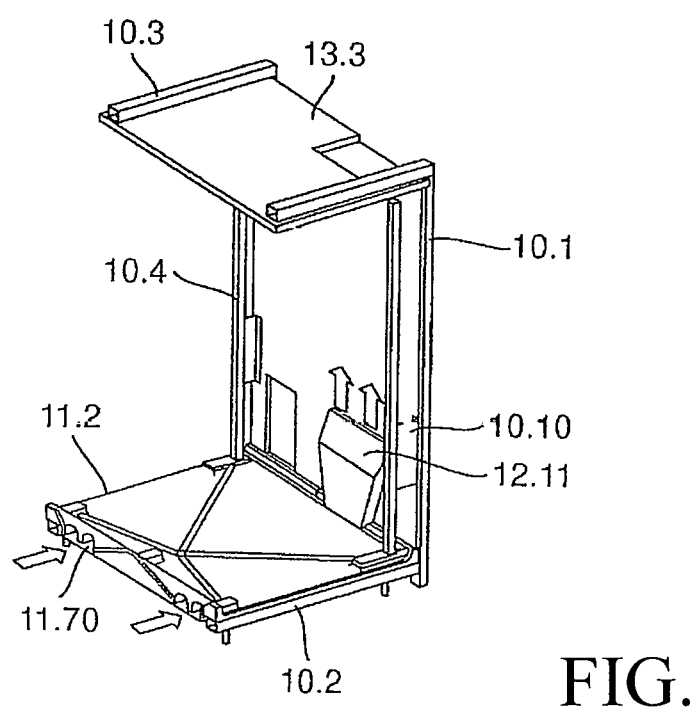
Figure 11M:
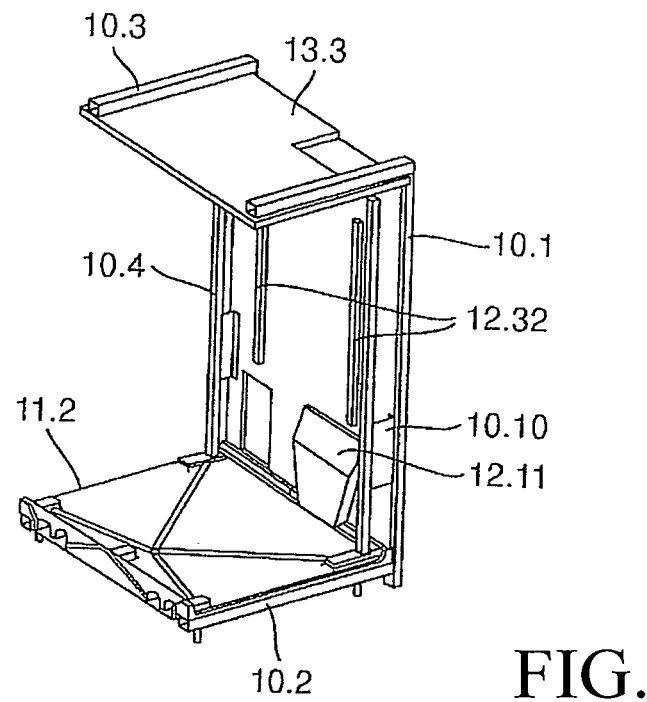
Figure 11N:
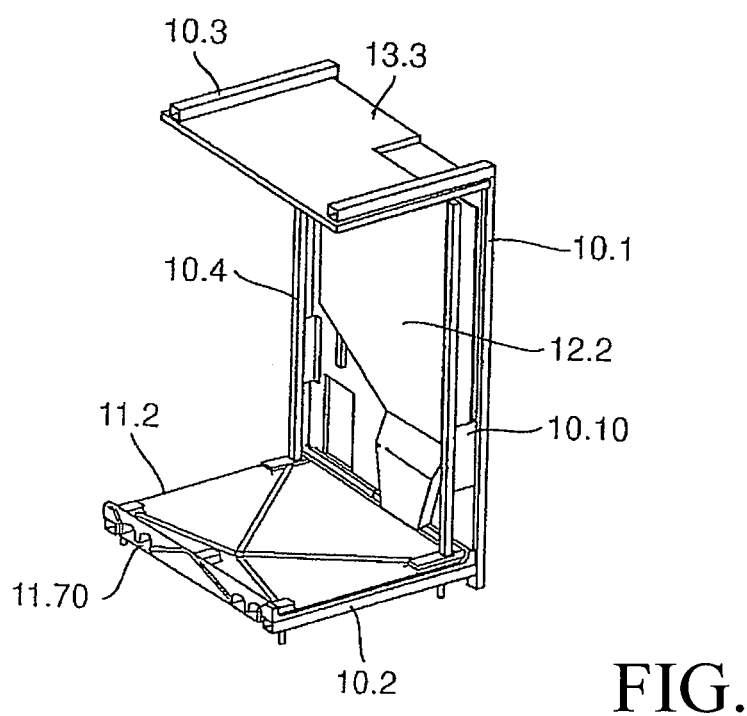
Figure 11O:
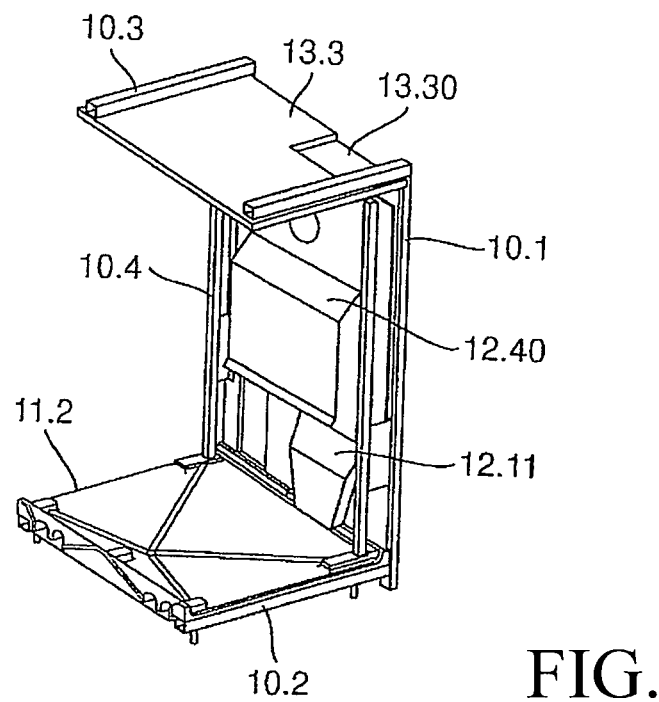
Figure 11P:
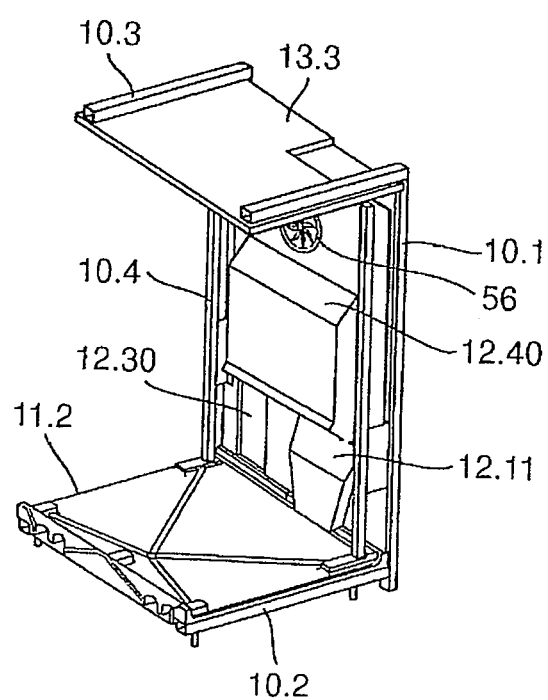
Figure 11Q:
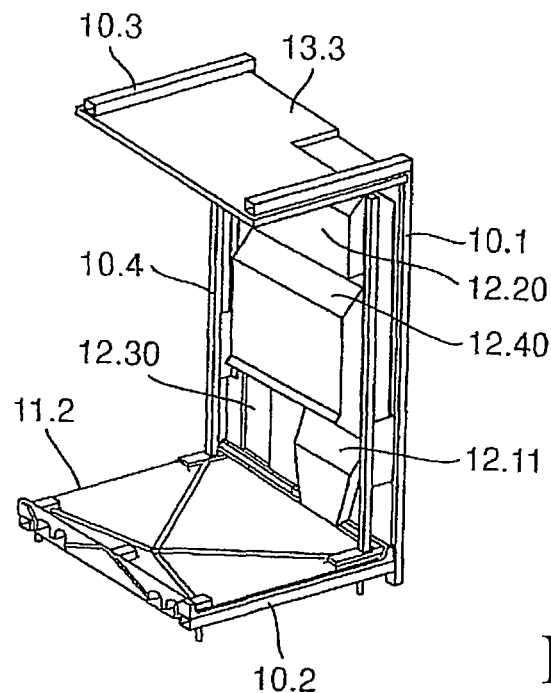
Figure 11R:
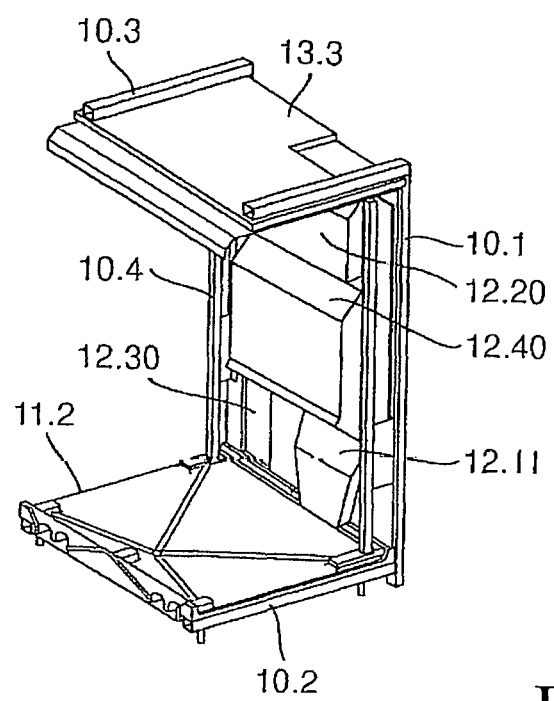
Figure 11S:
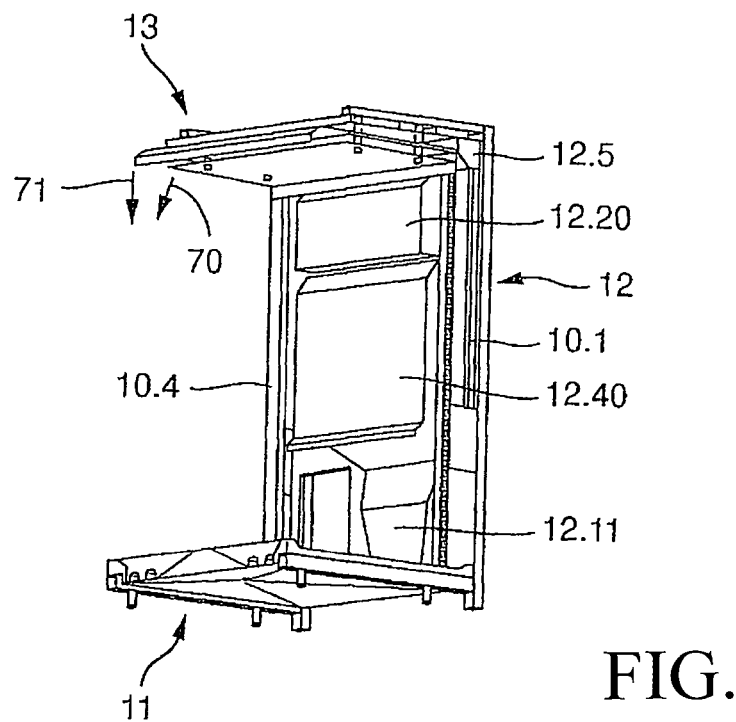
Figure 11T:
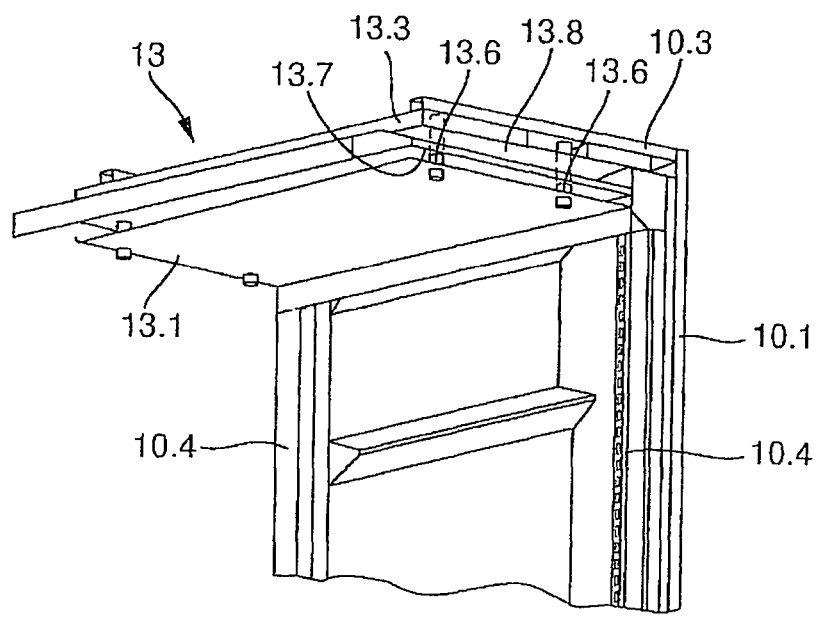
Figure 11U:
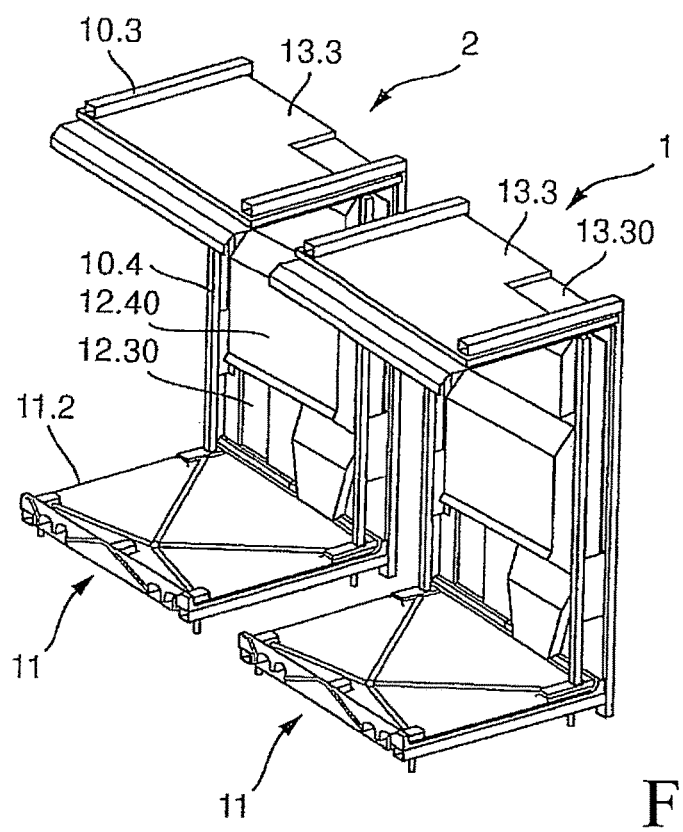
Figure 11V:
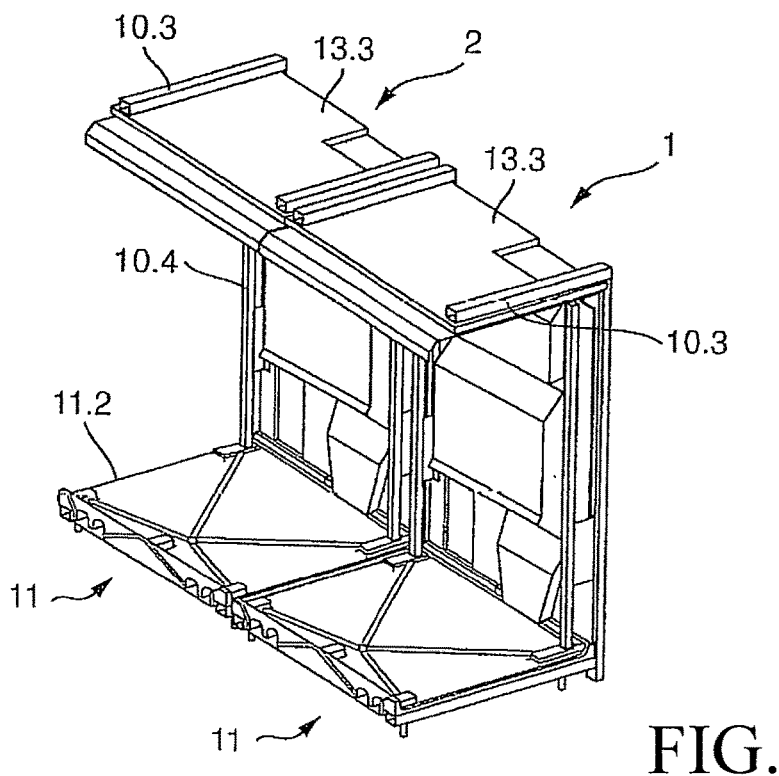
Figure 11W:
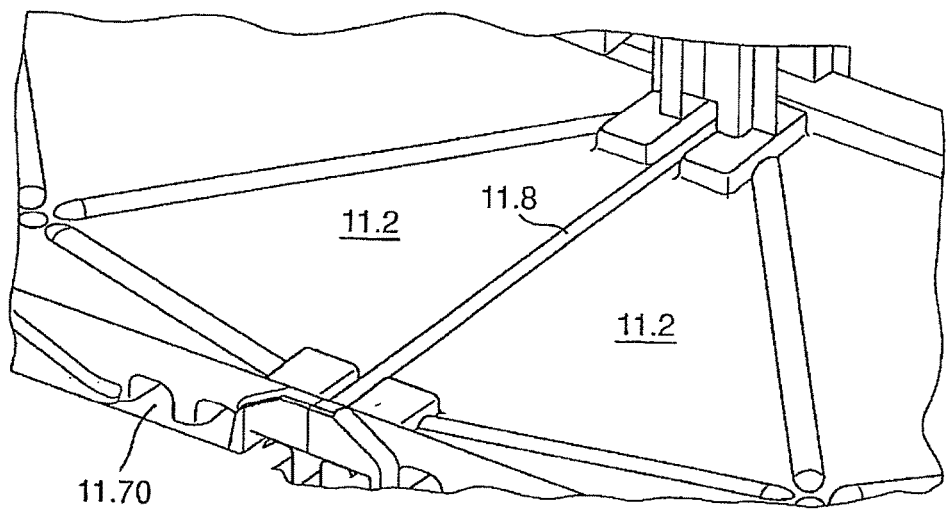
Figure 11X:
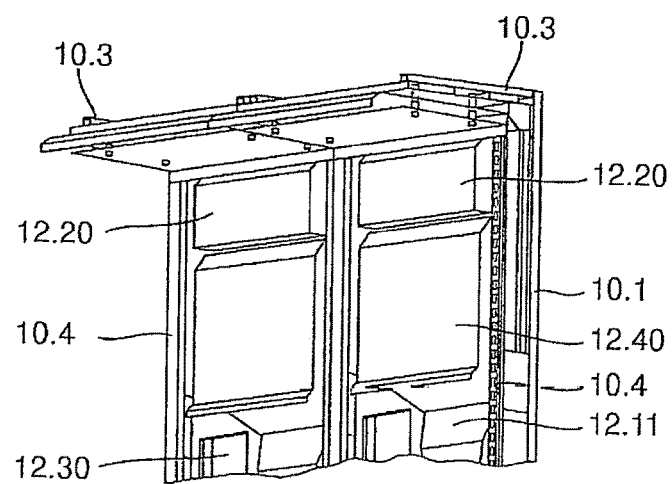

FIGS. 11A through 11X show one exemplary embodiment for successive assembly steps of constructing a shelving module 1, 2, 3 or cooling unit as well as a system composed of or comprising two shelving modules. If so desired, individual assembly steps here can also be omitted, changed, or swapped.

First, according to FIG. 11A, two side frames 10 are each produced from a vertical profile 10.1, a lower horizontal profile 10.2 protruding forward in the vertical profile's lower region, and an upper horizontal profile 10.3 protruding forward in the vertical profile's upper region. The undersides of the lower horizontal profiles 10.2 are provided with height-adjustable feet 60, 61 and at the lower end of the vertical profiles 10.1, the anti-tipping device 62 protrudes downward. In the exemplary embodiment shown, the upper horizontal profile 10.3 is embodied as shorter than the lower horizontal profile 10.2, but in a likewise advantageous embodiment, the upper horizontal profile 10.3 can be embodied as exactly the same length or longer than the lower horizontal profile 10.2, in order to be able to attach the upper group 13 in a stable fashion. The two side frames 10 are embodied as spaced apart from each other in accordance with the width of the shelving module 1, 2, 3.

In another step (FIG. 11B), the base plate 11.3 as the lower cover of the base group 11 is provided with a back side 11.30 that is to be turned toward the vertical profiles 10.1 and the drain hole 11.21. This covers the underside of the deflector plate 11.2 with the molded conduits 11.20, as shown in the subsequent assembly step according to FIG. 11C. In lieu of the base plate 11.3, however, the molded conduits 11.20 can also be separately covered and advantageously sealed by one or more partial plates. As also shown in FIG. 11C, the molded conduit 11.20 that is composed of or comprises, for example, a plurality of sub-conduits feeds into a relatively wide slit-like outlet opening 11.22 situated on one side of the back of the deflector plate 11.2, opens upward and is delimited on the back side by a bending of the base plate 11.3 or a partial plate. The drawing also shows the inlet openings 11.70 of the molded conduit 11.20.

In a subsequent step according to FIG. 11D, the thus-prepared deflector plate 11.2 is placed onto the lower horizontal profiles 10.2 and fastened.

Then according to FIG. 11E, the thermally insulating outer casing 12.3 is mounted onto the front side of the vertical profiles 10.1. In the lower region, the outer casing 12.3 is provided with a compressor opening 12.30 extending through it for subsequent installation of the compressor, which is situated next to the outlet opening 11.22 of the deflector plate 11.2. Above the outlet opening 11.22, a lower fan opening 12.10 is provided in the outer casing 12.3, but is covered on the back side of the outer casing 12.3 such as with a thin covering layer of the outer casing 12.3 or a separate plate and forms a conduit for the air flow from the outlet opening 11.22 of the lower fan 57 to be subsequently installed.

In another step, the upper cover 13.3 is mounted to the underside of the upper horizontal profiles 10.3 (FIG. 11F). In the exemplary embodiment shown, the upper cooling component receptacle 13.30 is cut out from the right, rear of the top side of the upper cover 13.3, leaving only a lower covering layer of the thermally insulating upper cover 13.3.

In the next step shown in FIG. 11G, spacers 12.31 are fastened to the front side of the outer casing 12.3 in the vicinity of or near the vertical edges.

Then, the support profiles 10.4 are installed between the upper and lower horizontal profiles 10.3, 10.2, in their rear region, spaced apart from and parallel to the front side of the vertical profiles 10.1, using the support plates 10.40, 10.50 and the insulating intermediate pieces between the underside of the upper cover 13.3 and the top side the deflector plate 11.2 (FIG. 11H).

In the next step of the method (FIG. 11I), fixing parts 10.10 are mounted, if necessary, between the support profiles 10.4 and the vertical profiles 10.1, for stiffening purposes or to serve as holding elements, but can also be omitted if the supporting force is sufficient.

In a subsequent step (FIG. 11J), the lower fan 57 is mounted in front of the lower fan opening 12.10 and in subsequent steps, is enclosed with a fan housing 12.11 (FIGS. 11K and 11L) in order to form the lower region of the outer vertical flow conduit.

In another step (FIG. 11M), the front side of the outer casing 12.3 has strip-like vertical spacers 12.32 mounted onto it, onto which the intermediate wall 12.2 is mounted, spaced apart from the outer casing 12.3 to form the upper region of the vertical flow conduit, producing a connection to the upper opening of the fan housing 12.11 (FIG. 11N).

A plate-like cooling air baffle plate 12.40 is mounted onto the intermediate wall 12.2 and spaced apart from it, behind which the evaporator 50, 50', 50" (not shown) or another heat exchanger is placed. In addition, the upper fan 56 is mounted on a plate that is spaced apart from the intermediate wall 12.2 (FIGS. 11O and 11P). The upper fan 56 or instead of it, a plurality, such as two, upper fans situated next to one another, in which case it is also possible to omit the lower fan 57, each is covered by an upper fan cover 12.20 in a housing-like fashion. Cooling air flowing upward out of the evaporator 50, 50', 50" or heat exchanger is taken in by the upper fan 56, for example in the axial direction, and conveyed away in the radial direction, in fact with one partial flow traveling downward on the inside of the cooling air baffle plate 12.40 oriented toward the cooling chamber 4 and one partial flow traveling upward into the upper, inner intermediate space 13.7 of the correspondingly added upper group 13 (FIGS. 11Q and 11R). The housing-like upper fan cover 12.20 is embodied to route the air flow in the desired direction and with the desired intensity and can also be provided with an intermediate partition between two fans 57 in order to avoid a reciprocal influence (such as short-circuiting). For example, outflow openings of a calibrated size can be provided in the fan cover 12.20, toward the top and bottom and also toward the front if so desired.

The outer vertical flow conduit 12.5 is also connected to the relevant outer upper flow conduit 13.8 of the upper group 13, after which the outer upper flow conduit 13.8 and the upper intermediate space 13.7 in the upper group 13 are produced using the support pins 13.6 (FIGS. 11S and 11T). In this case, the slit-like outlet opening 13.50 and the outlet slit 13.80 for the cold air curtain 70 and the warm air curtain 71 are also provided in the front, lower region of the upper group 13.

In other steps, a cooling unit system is constructed, such as out of two shelving modules 1, 2, as shown in FIGS. 11U, 11V, 11W, and 11X. In these steps, the side frames 10 on the vertical profiles 10.1, the lower horizontal profiles 10.2, and/or the upper horizontal profiles 10.3 are clamped to each other in a definite relative position with the interposition of spacer elements such as spacer sleeves and are sealed along the narrow edges that face one another on their outer casings 12.3, deflector plates 11.2, and upper covers 13.3 with the interposition of sealing elements such as sealing strips 11.8 with a mushroom-shaped cross-section.

The invention claimed is:

1. A cooling unit, comprising: C-shaped side frames (10) disposed spaced apart and on opposing ends of an entire width of the cooling unit, wherein the side frames are support frames, and each of the side frames is a frame profile including a rear vertical profile (10.1) and a lower and upper horizontal profile (10.2, 10.3) protruding forward from the rear vertical profile; a rear wall group (12) with a thermally insulating outer casing (12.3) mounted at opposing side edges on and between the vertical profiles (10.1), a base group (11) mounted on and between the lower horizontal profiles (10.2), and an upper group (13) mounted on and between the upper horizontal profiles (10.3), the rear wall group (12), the base group (11), and the upper group (13) connecting the spaced apart side frames together;

the groups enclosing a cooling chamber (4) from behind, below, and above; and at least the thermally insulating outer casing (12.3) of the rear wall group (12) attached to an inside of the vertical profile oriented toward the cooling chamber (4).

2. The cooling unit according to claim 1, wherein the lower horizontal profiles (10.2) have feet (60, 61) for supporting on a floor and for compensating for differences in heights.

3. The cooling unit according to claim 2, wherein a support profile (10.4) is built into each side frame (10), extending between the lower and upper horizontal profile (10.2, 10.3) in a rear region, and spaced apart from and forward of the vertical profile (10.1).

4. The cooling unit according to claim 3, wherein each respective support profile (10.4) of metal is installed and supported in relation to the lower and upper horizontal profile (10.2, 10.3) without a metallic connection by thermally insulating intermediate pieces (10.41, 10.51).

5. The cooling unit according to claim 4, wherein the support profiles (10.4) have rows of holes in a predetermined spacing pattern, into which support arms for shelves are hooked that protrude forward into the cooling chamber (4).

6. The cooling unit according to claim 5, wherein the cooling unit is C-shaped when viewed from a side; the base group (11) has a thermally insulating deflector plate (11.2) that is attached to the two lower horizontal profiles (10.2), the upper group (13) has a thermally insulating plate-shaped upper cover (13.3) attached to the two upper horizontal profiles (10.3), and each of the outer casing (12.3), the deflector plate (11.2), and the upper cover (13.3) is situated on the inside of the frame profiles and oriented toward the cooling chamber (4).

7. The cooling unit according to claim 6, wherein a rear edge of the thermally insulating deflector plate (11.2) attached to the two lower horizontal profiles (10.2) adjoins the lower edge of the outer casing (12.3) directly or indirectly by transition elements and a rear edge of the thermally insulating plate-shaped upper cover (13.3) adjoins the upper edge of the outer casing (12.3) directly or indirectly by other transition elements.

8. The cooling unit according to claim 7, wherein an evaporator (50, 50', 50") or other heat exchanger for cooling the cooling chamber (4) is situated in a chamber of the rear wall group (12) between the front side of the outer casing (12.3) and a plane formed by the front side of the support profiles (10.4), and the evaporator (50, 50', 50") or other heat exchanger is attached to the front side of the outer casing (12.3) by a support device.

9. The cooling unit according to claim 8, wherein the chamber of the rear wall group (12) contains at least one fan (56) for producing a cold air flow that is acted on with cooling power by the evaporator (50, 50', 50") or other heat exchanger and at least part of the cold air flow is conveyed into the cooling chamber (4).

10. The cooling unit according to claim 9, wherein the rear wall group (12), the base group (11), and/or the upper group (13) has a layered structure with a plurality of plate-shaped wall elements that are spaced apart from one another and produce at least one intermediate space for routing an air flow.

11. The cooling unit according to claim 10, wherein the respective plate-shaped wall elements are embodied on the outer casing (12.3), on the top side of the deflector plate (11.2), and/or on the underside of the upper cover (13.3), respectively on the side oriented toward the cooling chamber.

12. The cooling unit according to claim 11, wherein the plate-shaped wall elements of the upper group (13) are mounted by thermally insulating support pins (13.6) fastened to the underside of the horizontal profiles (10.3) on both sides.

13. The cooling unit according to claim 12, wherein inner intermediate chambers close to the cooling chamber and connected to one another for a cold air flow and outer flow conduits are spaced apart from the cooling chamber (4) and connected to one another for a warm air flow are in the rear wall group (12), the upper group (13), and the base group (11) and the circulating air flows on the front side of the cooling unit produce a cold air loop (70) by the cold air flow and a warm air loop (71) by the warm air flow, achieving an insulation of the cooling chamber (4) relative to the surroundings.

14. A method for constructing a cooling unit according to claim 1, wherein two of the C-shaped side frames (10) are produced, each with a vertical profile (10) and the lower and upper horizontal profile (10.2, 10.3) protruding forward from the rear vertical profile; a deflector plate (11.2) made of a thermally insulating material and belonging to a base group (11) is mounted onto the lower horizontal profiles (10.2), a thermally insulating outer casing (12.3) belonging to a rear wall group (12) is mounted onto the front side of the vertical profiles (10.1), and a thermally insulating upper cover (13.3) belonging to an upper group (13) is mounted onto the underside of the upper horizontal profiles (10.3); spaced apart from a top side of the deflector plate (11.2), the front side of the outer casing (12.3), and the underside of the upper cover (13.3), plate-shaped wall elements are installed for routing an air flow, where components of a cooling device (5) are incorporated at least into the rear wall group (12); and support profiles (10.4) are installed spaced apart from the front side of the vertical profiles (10.1) in parallel fashion, between the rear regions of the lower and upper horizontal profiles (10.2, 10.3).

15. A system including a plurality of the cooling units according to claim 12, wherein a plurality of cooling units (1, 2, 3) aligned next to one another in a row are connected to one another at their adjacent side frames (10); sealing components are inserted between the base groups (11), rear wall groups (12), the upper groups (13) of adjacent cooling units.

16. The system according to claim 15, wherein spacer elements are inserted between the adjacent side frames (10) that are clamped to each other and the sealing elements are inserted between the narrow edges that face one another on the thermally insulating outer casing (12.3), the thermally insulating deflector plates (11.2), and the thermally insulating upper cover (13.3).

17. The cooling unit according to claim 1, further comprising a support profile (10.4) built into each side frame (10), extending between the lower and upper horizontal profile (10.2, 10.3) in a rear region, and spaced apart from and forward of the vertical profile (10.1).

18. The cooling unit according to claim 3, wherein the support profiles (10.4) have rows of holes in a predetermined spacing pattern, into which support arms for shelves are hooked that protrude forward into the cooling chamber (4).

19. The cooling unit according to claim 1, wherein the cooling unit is C-shaped when the base group (11), the rear wall group (12), and the upper group (13) that enclose the cooling chamber (4) from behind, below, and above, and have at least part of the components of a cooling device (5), are viewed from a side; the base group (11) has a thermally insulating deflector plate (11.2) that is attached to the two lower horizontal profiles (10.2), and the upper group (13) has a thermally insulating plate-shaped upper cover (13.3) attached to the two upper horizontal profiles (10.3); and each of the outer casing (12.3), the deflector plate (11.2), and the upper cover (13.3) is situated on the inside of the frame profiles and oriented toward the cooling chamber (4).

20. The cooling unit according to claim 3, wherein an evaporator (50, 50', 50") or other heat exchanger for cooling the cooling chamber (4) is situated in a chamber of the rear wall group (12) between the front side of the outer casing (12.3) and a plane formed by the front side of the support profiles (10.4), and the evaporator (50, 50', 50") or other heat exchanger is attached to the front side of the outer casing (12.3) by a support device.

21. The cooling unit according to claim 1, wherein the rear wall group (12), the base group (11), and/or the upper group (13) has a layered structure with a plurality of plate-shaped wall elements that are spaced apart from one another and produce at least one intermediate space for routing an air flow.

22. The cooling unit according to claim 1, wherein at least the rear wall group (12) encloses both an inner intermediate chamber close to the cooling chamber for a cold air flow and an outer flow conduit on an opposite side of the inner intermediate chamber from the cooling chamber (4) and between the inner intermediate chamber and the thermally insulating cover for a warm air flow, wherein the upper group (13), the base group (11), and circulating air flows on the front side of the cooling unit produce a cold air loop (70) by the cold air flow and a warm air loop (71) by the warm air flow, achieving an insulation of the cooling chamber (4) relative to the surroundings.

23. A system including a plurality of the cooling units according to claim 1, wherein the plurality of the cooling units (1, 2, 3) aligned next to one another in a row have adjacent side frames (10) connected to one another; sealing components are inserted between the base groups (11), rear wall groups (12), the upper groups (13) of adjacent cooling units.

24. A cooling unit, comprising: two C-shaped side frames (10) spaced apart and situated on opposing sides of the cooling unit, each of the C-shaped side frames being a support frame with a frame profile including a rear vertical profile (10.1), a lower horizontal profile (10.2), and an upper horizontal profile (10.3), the lower and upper horizontal profiles each protruding forward from the rear vertical profile;

a rear wall group (12) including an inner cover (12.1), a thermally insulating outer casing (12.3), and two separate air flow spaces enclosed between the inner cover (12.1) and the outer casing (12.3), the outer casing (12.2) mounted at opposing side edges on inside surfaces of, and extending between, the rear vertical profiles (10.1), wherein the inner cover (12.1) is on a side of the outer casing (12.3) that is opposite the rear vertical profiles (10.1);

a base group (11) including a thermally insulating lower plate mounted on inside surfaces of, and extending between, the lower horizontal profiles (10.2);

an upper group (13) including a thermally insulating upper plate mounted on inside surfaces of, and extending between, the upper horizontal profiles (10.3); and the groups enclosing a cooling chamber (4) from behind, below, and above; and a cooling device at least partially housed by the cooling unit and in cooling combination with the cooling chamber (4).

* * * * *